(12) United States Patent
Murat et al.

(10) Patent No.: US 12,314,854 B2
(45) Date of Patent: *May 27, 2025

(54) NEURAL NETWORK BASED DETERMINATION OF GAZE DIRECTION USING SPATIAL MODELS

(71) Applicant: NVIDIA Corporation, Santa Clara, CA (US)

(72) Inventors: Nuri Arar Murat, Zurich (CH); Hairong Jiang, Campbell, CA (US); Nishant Puri, San Francisco, CA (US); Rajath Shetty, Santa Clara, CA (US); Niranjan Avadhanam, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/298,115

(22) Filed: Apr. 10, 2023

(65) Prior Publication Data

US 2023/0244941 A1 Aug. 3, 2023

Related U.S. Application Data

(63) Continuation of application No. 17/005,914, filed on Aug. 28, 2020, now Pat. No. 11,657,263.

(Continued)

(51) Int. Cl.
G06N 3/08 (2023.01)
G06F 18/21 (2023.01)
(Continued)

(52) U.S. Cl.
CPC ............. *G06N 3/08* (2013.01); *G06F 18/214* (2023.01); *G06F 18/2193* (2023.01);
(Continued)

(58) Field of Classification Search
CPC ...... G06V 10/82; G06V 10/764; G06V 10/95; G06V 10/774; G06V 20/597;
(Continued)

(56) References Cited

U.S. PATENT DOCUMENTS 9,069,794 B1 6/2015 Bandukwala et al.
10,242,457 B1 3/2019 Sibley
(Continued)

FOREIGN PATENT DOCUMENTS

CA 2461641 A1 8/2005
CN 102887121 A 1/2013
(Continued)

OTHER PUBLICATIONS

Arar, Nuri Murat ; First Office Action for Chinese Patent Application No. 202011400019.7, filed Dec. 2, 2020, mailed Sep. 29, 2023, 14 pgs.

(Continued)

*Primary Examiner* — Tuan H Nguyen
(74) *Attorney, Agent, or Firm* — Taylor English Duma L.L.P.

(57) ABSTRACT

Systems and methods for determining the gaze direction of a subject and projecting this gaze direction onto specific regions of an arbitrary three-dimensional geometry. In an exemplary embodiment, gaze direction may be determined by a regression-based machine learning model. The determined gaze direction is then projected onto a three-dimensional map or set of surfaces that may represent any desired object or system. Maps may represent any three-dimensional layout or geometry, whether actual or virtual. Gaze vectors can thus be used to determine the object of gaze within any environment. Systems can also readily and efficiently adapt for use in different environments by retrieving a different set of surfaces or regions for each environment.

20 Claims, 12 Drawing Sheets

Related U.S. Application Data

(60) Provisional application No. 62/948,796, filed on Dec. 16, 2019.

(51) Int. Cl.

| | | |
|---|---|---|
| *G06F 18/214* | (2023.01) | |
| *G06N 20/00* | (2019.01) | |
| *G06V 10/764* | (2022.01) | |
| *G06V 10/774* | (2022.01) | |
| *G06V 10/82* | (2022.01) | |
| *G06V 10/94* | (2022.01) | |
| *G06V 20/59* | (2022.01) | |
| *G06V 20/64* | (2022.01) | |
| *G06V 40/16* | (2022.01) | |
| *G06V 40/18* | (2022.01) | |

(52) U.S. Cl.
CPC ........... *G06N 20/00* (2019.01); *G06V 10/764* (2022.01); *G06V 10/774* (2022.01); *G06V 10/82* (2022.01); *G06V 10/95* (2022.01); *G06V 20/597* (2022.01); *G06V 20/647* (2022.01); *G06V 40/171* (2022.01); *G06V 40/193* (2022.01)

(58) Field of Classification Search
CPC .. G06V 20/647; G06V 40/171; G06V 40/193; G06F 18/214; G06F 18/2193; G06N 3/08; G06N 20/00
See application file for complete search history.

(56) References Cited

U.S. PATENT DOCUMENTS

| | | | |
|---|---|---|---|
| 10,885,698 | B2 | 1/2021 | Muthler et al. |
| 11,487,968 | B2 | 11/2022 | Arar et al. |
| 11,657,263 | B2 | 5/2023 | Arar et al. |
| 11,934,955 | B2 | 3/2024 | Arar et al. |
| 2012/0011142 | A1 | 1/2012 | Baheti et al. |
| 2014/0270374 | A1 | 9/2014 | Unzueta |
| 2016/0027218 | A1 | 1/2016 | Salter et al. |
| 2016/0063720 | A1 | 3/2016 | Han et al. |
| 2016/0202756 | A1* | 7/2016 | Wu ........................ G06F 3/0304 382/103 |
| 2017/0038781 | A1 | 2/2017 | Querejeta Masaveu et al. |
| 2017/0043712 | A1 | 2/2017 | Paszkowicz et al. |
| 2018/0020207 | A1 | 1/2018 | Sugimura et al. |
| 2018/0047288 | A1 | 2/2018 | Cordell et al. |
| 2018/0239361 | A1 | 8/2018 | Micks et al. |
| 2019/0080149 | A1 | 3/2019 | Gernoth et al. |
| 2019/0080419 | A1 | 3/2019 | Yazdi et al. |
| 2019/0213429 | A1* | 7/2019 | Sicconi ................... G06F 3/012 |
| 2019/0278108 | A1 | 9/2019 | Ang et al. |
| 2019/0303759 | A1 | 10/2019 | Farabet et al. |
| 2021/0104068 | A1 | 4/2021 | Marks et al. |
| 2023/0078171 | A1 | 3/2023 | Arar et al. |
| 2024/0265254 | A1 | 8/2024 | Arar et al. |

FOREIGN PATENT DOCUMENTS

| | | |
|---|---|---|
| CN | 104685541 A | 6/2015 |
| CN | 106662925 A | 5/2017 |
| CN | 107622240 A | 1/2018 |
| CN | 107665330 A | 2/2018 |
| CN | 107808147 A | 3/2018 |
| CN | 107871134 A | 4/2018 |
| CN | 108090470 A | 5/2018 |
| CN | 108171218 A | 6/2018 |
| CN | 109583338 A | 4/2019 |
| CN | 109849788 A | 6/2019 |
| CN | 109886153 A | 6/2019 |
| CN | 109906165 A | 6/2019 |
| CN | 109923466 A | 6/2019 |

OTHER PUBLICATIONS

Arar, Nuri Murat; Notice of Allowance for U.S. Appl. No. 18/051,296, filed Oct. 31, 2022, mailed Nov. 8, 2023, 23 pgs.

Murat Arar, Nuri; Second Office Action for Chinese Patent Application No. 202011474336.3, filed Dec. 14, 2020, mailed Dec. 27, 2023, 8 pgs.

IEC 61508, "Functional Safety of Electrical/Electronic/Programmable Electronic Safety-related Systems," https://en.wikipedia.org/wiki/IEC_61508, accessed on Apr. 1, 2022, 7 pgs.

ISO 26262, "Road vehicle - Functional safety," International standard for functional safety of electronic system, https://en.wikipedia.org/wiki/ISO_26262, accessed on Sep. 13, 2021, 8 pgs.

"System and Method for Controlling Autonomous Vehicles", U.S. Provisional U.S. Appl. No. 62/614,466, filed Jan. 17, 2018.

"System and Method for Safe Operation of Autonomous Vehicles", U.S. Appl. No. 62/625,351, filed Feb. 2, 2018.

"Systems and Methods for Safe and Reliable Autonomous Vehicles", U.S. Appl. No. 62/584,549, filed Nov. 10, 2017.

Arar, Nuri Murat; Non-Final Office Action for U.S. Appl. No. 18/051,296, filed Oct. 31, 2022, mailed May 30, 2023, 16 pgs.

Arar Murat, Nuri; First Office Action for Chinese Patent Application No. 202011474336.3, filed Dec. 14, 2020, mailed Sep. 27, 2023, 11 pgs.

Murat Arar, Nuri; Second Office Action for Chinese Patent Application No. 202011400019.7, filed Dec. 2, 2020, mailed Apr. 10, 2024, 13 pgs.

Murat Arar, Nuri; Decision on Rejection for Chinese Patent Application No. 202011474336.3, filed Dec. 14, 2020, mailed Apr. 8, 2024, 7 pgs.

Arar, Nuri Murat; Final Office Action for U.S. Appl. No. 17/005,914, filed Aug. 28, 2020, mailed Nov. 28, 2022, 7 pgs.

"Taxonomy and Definitions for Terms Related to Driving Automation Systems for On-Road Motor Vehicles", Society of Automotive Engineers (SAE), Standard No. J3016-201609, pp. 30 (Sep. 30, 2016).

"Taxonomy and Definitions for Terms Related to Driving Automation Systems for On-Road Motor Vehicles", Society of Automotive Engineers (SAE), Standard No. J3016-201806, pp. 35 (Jun. 15, 2018).

"Conservative Control for Zone Driving of Autonomous Vehicles Using Safe Time of Arrival", United States U.S. Appl. No. 62/628,831, filed Feb. 9, 2018.

"Convolutional Neural Networks to Detect Drivable Freespace for Autonomous Vehicles", U.S. Appl. No. 62/643,665, filed Mar. 15, 2018.

"Methodology of Using a Single Controller (ECU) For a Fault-Tolerant/Fail-Operational Self-Driving System", United States U.S. Appl. No. 62/524,283, filed Jun. 23, 2017.

"Methods for accurate real-time object detection and for determining confidence of object detection suitable for D autonomous vehicles", U.S. Appl. No. 62/631,781, filed Feb. 18, 2018.

"Pruning Convolutional Neural Networks for Autonomous Vehicles and Robotics", U.S. Appl. No. 62/630,445, filed Feb. 14, 2018.

"System and Method for Autonomous Shuttles, Robo-Taxis, Ride-Sharing and On-Demand Vehicles", U.S. Appl. No. 62/635,503, filed Feb. 26, 2018.

"System and Method for Sharing Camera Data Between Primary and Backup Controllers in Autonomous Vehicle Systems", U.S. Appl. No. 62/629,822, filed Feb. 13, 2018.

"System and Methods for Advanced AI-Assisted Vehicles", U.S. Appl. No. 62/648,358, filed Mar. 26, 2018.

"Detection of Hazardous Autonomous Driving Using Machine Learning," United States U.S. Appl. No. 62/622,538, filed Jan. 26, 2018.

Arar, Nuri Murat; Notice of Allowance for U.S. Appl. No. 17/005,914, filed Aug. 28, 2020, mailed Jan. 20, 2023, 9 pgs.

U.S. Appl. No. 62/522,520, filed Jun. 20, 2017.
U.S. Appl. No. 15/836,549 having a filing date of Nov. 10, 2017.
U.S. Appl. No. 62/742,923, filed Oct. 8, 2018.
U.S. Appl. No. 62/439,870, filed Dec. 26, 2018.
U.S. Appl. No. 16/363,648, filed Mar. 25, 2019.
U.S. Appl. No. 62/948,789, filed Dec. 16, 2019.

(56) References Cited

OTHER PUBLICATIONS

U.S. Appl. No. 62/948,793, filed Dec. 16, 2019.
Hassner, T., et al., "Effective Face Frontalization in Unconstrained Images", In Proceedings of the IEEE Conference on Computer Vision and Pattern Recognition (2015) 10 pgs.
Kahou, S.E., et al.; "Combining Modality Specific Deep Neural Networks for Emotion Recognition in Video"; In Proceedings of the 15th ACM on International Conference on Multimodal Interaction (ICMI), Dec. 9-13, 2013; 8 pgs.
Liu, Y., et al.; "Exploring Disentagled Feature Representation Beyond Face Identification"; In Proceedings of the IEEE Conference on Computer Vision and Pattern Recognition, 2018, 10 pgs.
Park, S., et al.; "Few-Shot Adaptive Gaze Estimation"; arXiv:1905.01941v2, Oct. 14, 2019, 13 pgs.
Yang, T-Y., et al.; "FSA-Net: Learning Fine-Grained Structure Aggregation for Head Pose Estimation from a Single Image"; In Proceedings of the IEEE Conference on Computer Vision and Pattern Recognition, 2019, 10 pgs.
Zhu, M., et al.; "Robust Facial Landmark Detection via Occlusion-adaptive Deep Networks"; In Proceedings of the IEEE Conference on Computer Vision and Pattern Recognition, 2019, 11 pgs.
Zhu, X., et al.; "Face Alignment in Full Pose Range: A 3D Total Solution"; IEEE Transactions on Pattern Analysis and Machine Intelligence, vol. 41, No. 1, 2017; 14 pgs.
"Systems and Methods for Safe and Reliable Autonomous Vehicles" United States U.S. Appl. No. 62/584,549, filed Nov. 10, 2017.
"System and Method for Controlling Autonomous Vehicles", U.S. Appl. No. 62/614,466, filed Jan. 7, 2018.
Non-Final Office Action dated Aug. 18, 2021 in U.S. Appl. No. 17/004,252, 9 pgs.
Notice of Allowance for U.S. Appl. No. 17/004,252, filed Aug. 27, 2020, mailed Jan. 13, 2022, 9 pgs.
Arar, Nuri Murat; Non-Final Office Action for U.S. Appl. No. 18/605,628, filed Mar. 14, 2024, mailed Sep. 26, 2024, 24 pgs.
Arar, Nuri Murat; Decision on Rejection for Chinese Patent Application No. 202011400019.7, filed Dec. 2, 2020, mailed Aug. 7, 2024, 13 pgs.
Arar, Nuri Murat; Final Office Action for U.S. Appl. No. 18/605,628, filed Mar. 14, 2024, mailed Mar. 20, 2025, 26 pgs.

* cited by examiner

110

120

130

NEURAL NETWORK BASED DETERMINATION OF GAZE DIRECTION USING SPATIAL MODELS

CROSS REFERENCE TO RELATED APPLICATION

This application is a continuation of U.S. patent application Ser. No. 17/005,914, filed Aug. 28, 2020, which claims the benefit of U.S. Provisional Patent Application No. 62/948,796, filed Dec. 16, 2019, the disclosure of which is hereby incorporated by reference herein in its entirety. This application also incorporates by reference U.S. patent application Ser. No. 17/004,252, which was filed on Aug. 27, 2020, herein in its entirety.

BACKGROUND

Recent convolutional neural networks (CNNs) have been developed to estimate gaze direction of subjects. Such CNNs can, for example, determine the direction a subject is looking from an input image of the subject. This allows systems using such CNNs to track subject gaze and react accordingly in real time.

Conventional gaze determination systems are not without their drawbacks, however. In particular, while conventional systems may determine gaze direction generally, they are unable to specifically pinpoint what the subject is actually looking at. For example, while some conventional in-vehicle gaze determination systems may determine that the driver is looking in a particular direction, e.g., straight ahead, off to one side, or the like, such systems do not determine the particular object or item the driver is gazing at, e.g., the dashboard, the road, the radio, or the like.

Accordingly, systems and methods are described herein for conducting machine learning based gaze analysis in more specific manner. Embodiments of the disclosure thus describe systems and methods for more specific, efficient, and flexible determination of gaze region. In an exemplary embodiment, gaze vectors are determined by a regression-based machine learning model. Determined gaze vectors are then projected onto a three-dimensional map of surfaces that may represent any desired object or system. Maps may represent any three-dimensional layout or geometry. In this manner, gaze vectors can be used to determine the object of a subject's gaze in an arbitrary environment. Furthermore, systems can be readily and efficiently generated to determine the gaze of a subject operating within any system, with any actions taken in response.

In one embodiment of the disclosure, a machine learning model is employed to determine the gaze direction of a subject. The model may have as input features determined from image data of the subject, which may include relevant portions of the subject's image such as eye crops, one or more facial landmarks of the subject, and the like. Inputs may also include quantities determined from the subject's image, such as head pose, confidence values, and the like. In response, the model generates a gaze direction of the subject, as its output.

The system also retrieves a set of spatial regions, i.e., defined areas or volumes. These regions may be defined in any manner, to correspond to real-world spatial objects. For instance, the set of spatial regions may correspond to locations and orientations of various interior surfaces of a vehicle. The system may then determine, from the gaze direction and the locations of the spatial regions, whether the subject's gaze intersects one or more of the spatial regions.

If so, the system may initiate an operation in response. Any such operation is contemplated. For example, when the subject is the driver of a vehicle and the spatial regions correspond to interior surfaces of the vehicle, the system may determine that the driver is gazing at a surface corresponding to the vehicle entertainment console, and may take responsive actions such as activating its interface, turning on/off displays, adjusting the volume, and the like.

The machine learning model may be any one or more models suitable for determining gaze direction of a subject from image data of the subject. As one example, the machine learning model may employ a regression model to determine gaze direction as a function of its various inputs.

As above, the set of spatial regions may describe the various locations and orientations of any set of surfaces. Accordingly, these spatial regions may describe any three-dimensional surfaces, arranged and oriented in any manner as desired. These surfaces may thus model any real- or virtual-world environment or object of interest, and systems of the disclosure may thus be used to determine the precise object or portion of his or her environment (i.e., which three-dimensional surface) upon which the subject is currently gazing. For instance, the surfaces may be the three-dimensional surfaces visible from the interior of a particular vehicle, which may include representations of the various windows of the vehicle as well as elements such as particular instruments, components, or features of the vehicle such as the radio, air conditioning system, dashboard displays, and the like. In this manner, the system may determine whether the driver's gaze is currently intersecting surfaces representing particular components, and take appropriate action by initiating some operation of the vehicle. As one example, the system may determine that the driver is currently gazing at the air conditioning dials, and may prompt the vehicle to respond in any number of ways, such as by altering its temperature settings, turning on/off the air conditioner, or the like. As another example, the system may determine that the driver is currently distracted or asleep, and may initiate an alarm alerting the driver, may initiate an emergency steering maneuver to pull the car over to the side of the road, or may initiate a braking maneuver. The spatial regions may be determined in any manner, such as by selecting regions taken from a computer aided design (CAD) or other computer based three dimensional model of one or more objects, by directly measuring objects, by determining locations of points or regions of an object from images of that object, or via a machine learning model trained to select and determine positions and orientations of regions of an object.

As above, the machine learning model or models may have any suitable inputs for determining subject gaze direction. These inputs may include, without limitation, any one or more of facial landmark points of the subject, head pose information of the subject, one or more eye gaze directions of the subject, one or more eye crops, or any confidence values associated with any of these inputs.

It is also noted that the image data used by the system may be any form of image data, whether corresponding to visible light images or otherwise, and may be received from or generated by any type of sensor. It is also noted that the use of a discrete set of spatial regions yields a modular system which can be used in conjunction with many different environments by simply adding a new set of spatial regions. That is, multiple different sets of spatial regions may be stored, corresponding to any environment desired. The system may then retrieve the appropriate set of spatial regions, and repeat the above process with the new regions. In this manner, the system may adaptively determine a subject's interactions with any desired environment.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for determining the gaze direction of a subject and projecting this gaze direction onto specific regions of an arbitrary three-dimensional geometry. In an exemplary embodiment, gaze direction may be determined by a regression-based machine learning model. The determined gaze direction is then projected onto a three-dimensional map or set of surfaces that may represent any desired object or system. Maps may represent any three-dimensional layout or geometry, whether actual or virtual. Gaze vectors can thus be used to determine the object of gaze within any environment. Systems can also readily and efficiently adapt for use in different environments by retrieving a different set of surfaces or regions for each environment.

Figure 1A:
FIGS. 1A-1C are pictures illustrating operation of a system in accordance with embodiments of the disclosure.
Figure 1B:
Figure 1C:

FIGS. 1A-1C are pictures illustrating operation of a system in accordance with embodiments of the disclosure. In FIG. 1A, a diagram 110 is an interior view of a vehicle with an occupant directing a gaze at the entertainment console, in accordance with some embodiments of the disclosure. The occupant 116 is seated in the driver's seat of the vehicle while momentarily directing her gaze 116 (e.g., directing her eyes) towards the entertainment console 119. An interior camera sensor 112 is mounted to the roof of the interior while a microphone sensor 114 is mounted within the entertainment console. The processing circuitry may receive image data from camera sensor 112 to determine the occupant and their respective gaze at the entertainment console.

The processing circuitry may calculate a gaze vector based on the data indicative of the eye gaze of the occupant, as described herein. In some embodiments, parallel processing circuitry may implement a machine learning model (e.g., a neural network) to calculate the gaze vector, such as described herein. The gaze vector may be a straight line in three-dimensional space with one intersection point at the eyes of the occupant 117 and a second intersection point at a point on the surface of the entertainment console 119.

The processing circuitry may determine an intersection between the gaze vector and the entertainment console 119. In particular, the processing circuitry may retrieve from a memory a stored set of spatial coordinates representing regions in three-dimensional space that correspond to various surfaces in the interior of the vehicle. One of these regions outlines the orientation and location of the entertainment console 119 within the vehicle. In this example, the processing circuitry extends the gaze vector from its determined origin point (e.g., the three-dimensional location of the eyes of the driver 117) to intersect the region corresponding to the entertainment console 119.

Upon determining the intersection between the gaze vector and the entertainment console 119, the processing circuitry may cause an operation to be performed in the vehicle. This operation may be performed by the one of more hardware components of the vehicle. For example, the vehicle may be equipped with various hardware components capable of providing a specific operation relating to the entertainment console 119, when the intersection is determined to be positioned at the entertainment console 119.

FIG. 1B illustrates a diagram 120 showing execution of a vehicle operation in response to a determination that the driver is gazing at the entertainment console 119, in accordance with some embodiments of the disclosure. The processing circuitry, subsequent to determining that the driver is gazing at the entertainment console 119, transmits an instruction to the entertainment console 119 to switch modes from "sleep" to "engaged." The engaged mode of the entertainment console provides for a screen with increased brightness 122 which provides enablement for further queries or requests from the occupant for specific operations. For example, the entertainment console, now with brightness and UI engaged, is responsive to receiving a particular radio station to tune to. Consequently, the system, upon recognition of the driver gazing at the entertainment console 119, alters the operating mode of the entertainment console 119. In this way, the system may use gaze as an operational trigger or "wake-up-word" for multimodal systems (e.g., virtual or digital personal assistants, conversational user interfaces, and other similar interfaces).

In some embodiments, the processing circuitry may receive, from sensors in the vehicle, other data from the occupant. For example, an interior camera 112 may receive lip activity of the occupant. The lip activity may be converted into textual information (e.g., lip activity processing may provide textual information being uttered by the occupant). In some embodiments, the other data may be audio data received by the vehicle interior microphone sensor 114. The processing circuitry may determine a service operation associated with the other data. For example, the processing circuitry may determine the occupant states "increase treble to level 4." The processing circuitry will determine that a corresponding operation within the entertainment console is to increase the treble of audio/video playback. The processing circuitry may then cause the service operation to be performed in the vehicle.

Embodiments of the disclosure contemplate processing and operation in multiple contexts, performed for multiple actors in parallel. For example, interior camera 200 may detect gaze activity from an occupant of the vehicle at a pre-defined point of interest (e.g., a camera) and correlate the detected gaze activity with lip activity and/or audio data corresponding to the occupant. Under such circumstances, the processing circuitry may maintain separate context streams for each occupant based on the determined source of gaze activity. Such individual context streams may be timed or semi-persistent. That is, context streams may be maintained despite being interrupted or otherwise rendered non-contiguous by activity corresponding to other context streams or multi-modal activity from other vehicle occupants. Where the context is determined to be the same, dialogue systems such as those contemplated by the present disclosure incorporate the audio data from different occupants to perform the same service operation. Accordingly, embodiments of the present disclosure contemplate the combination of multiple modalities (e.g., vision and speech) of user input detection to implement a dialogue system for conversational artificial intelligence operations, and to maintain multiple, separate contexts in a dialogue system within the context of a vehicle cabin. Embodiments of the present disclosure also contemplate applications within other settings. For example, vision information (such as, without limitation: any or all of gaze/body pose detection, gaze/body pose mapping, and/or object detection) may be combined with speech information (such as, without limitation: automated speech recognition or natural language processing) to perform machine learning-assisted operations within the context of a retail store, business office, medical facility, etc. The application of sensor fusion combined with multi-context systems to other use cases is provided by using modifiable/customizable use case graphs. Embodiments of the present disclosure also contemplate feedback mechanisms to inform the subject when his or her gaze is determined to intersect a particular spatial region. For instance, visual, haptic, or other feedback may be generated at a particular vehicle component when the system determines that the driver is gazing upon that component. Such feedback may, for example, further inform the driver of actions he or she may take.

FIG. 1C illustrates a diagram 130 showing multi-context analysis of user actions, in accordance with some embodiments of the disclosure. The processing circuitry, after instructing the entertainment console 119 to switch modes from "sleep" to "engaged," may further receive camera sensor information from the camera 112 of the occupant 116 silently stating, or whispering, the words "shift to heads-up display." The processing circuitry provides for visual processing on the video and/or picture frames of the silent/whispered words to determine the specific words used. The occupant may, for instance, have mouthed or whispered the words as to not wake another occupant sleeping in the backseat of the vehicle. The system, based on the occupant's gaze direction and the subsequent determined words, causes the user interface of the entertainment console to be projected on the windshield 132.

Figure 2A:
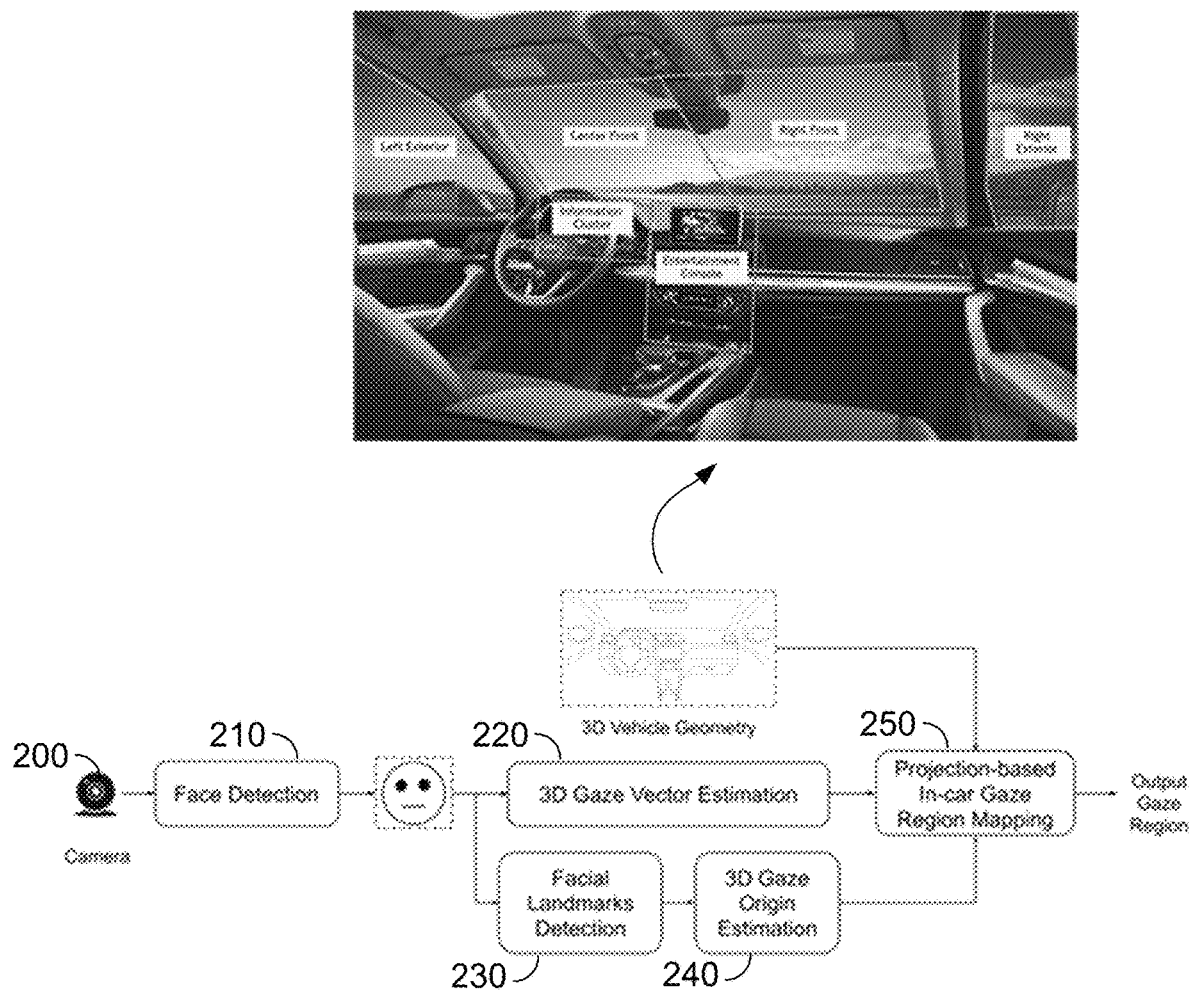
FIG. 2A is a block diagram illustrating an exemplary machine learning system for determining gaze direction and mapping this gaze direction to regions of any three-dimensional geometry, according to embodiments of the disclosure.

FIG. 2A is a block diagram illustrating an exemplary machine learning system for determining gaze direction and mapping this gaze direction to regions of any three-dimensional geometry. The system includes a camera 200, a face detection module 210, a gaze vector estimation module 220, facial landmark detection 230 and gaze origin estimation 240 modules, and a mapping module 250. The camera 200 captures images of a subject, such as a person, whose gaze direction is to be determined. The camera 200 transmits image data from captured images to the face detection module 210, which detects the face of the subject in the image. The face detection module 210 may be any software module or set of instructions capable of locating subject faces within an image using any method or process, and may be similar to the face detection module 210 of FIG. 2A as described above. The system of FIG. 2A may be implemented on, and executed by, any computing device, such as computing device 300.

Faces detected by this face detection module 210 may be cropped, with cropped face images transmitted to the gaze vector estimation module 220. Face crops may be determined by locating the subject's face in the image from the camera 200, and cropping the image accordingly. Face location can be carried out in any manner, such as by known computer vision-based face detection processes including any of the above non-neural network based techniques, neural network-based face recognition methods, and the like.

The gaze vector estimation module 220 may implement any one or more machine learning models capable of determining a subject's gaze direction from an input image of the subject's face. In one exemplary embodiment, the gaze vector estimation module 220 implements a regression model that estimates direction vector values from input gaze-related variables as further described below. The gaze vector estimation module 220 may implement any suitable regression model or models, such as a DNN-based linear regression model, statistical regression model, gradient boosting model, or the like, that may be configured to determine gaze vector from any input variables.

The input face crop is also input to a facial landmarks detection module 230 which determines facial landmarks from the input image of the subject's face. The facial landmarks module 230 may implement any machine learning network, e.g., any one or more machine learning models, capable of determining facial landmarks from an input image of a face. Module 230 may include machine learning models built according to holistic methods to represent global facial appearance and shape information, models built according to constrained local model methods that build local appearance models in addition to utilizing global shape models, generative networks, CNNs, and regression-based models that determine landmark positions as functions of facial shape and appearance information. Many such models are known, and embodiments of the disclosure contemplate use of any one or more such models, or any other suitable models or methods, to determine facial landmarks from an input image of a face. Models may be constructed using any architecture and methods suitable for determining facial landmarks from input images of faces. For example, facial landmarks networks based on CNNs may be structured using any convolution kernels and pooling layers suitable for extracting features of a face for determination of corresponding landmark points.

The facial landmarks output by the facial landmarks detection module 230 are then transmitted to the gaze origin estimation module 240, which determines the origin point of the gaze direction vector therefrom. The gaze origin estimation module 240 may implement any machine learning network, e.g., any one or more machine learning models capable of determining gaze origin points from an input set of facial landmarks. Such networks may include CNNs, classification models, regression models, or the like.

The estimated gaze vector and its origin point are then input to the mapping module 250, which determines a three-dimensional region the subject is looking at, by mapping the gaze vector from its origin point onto a set of three-dimensional regions. The mapping module 250 stores the set of three-dimensional regions, e.g., in storage 408, which describe a set of surfaces in three dimensions, and implements a mapping routine that projects the determined gaze vector from its origin point to determine whether it intersects one of the surfaces. The intersected surface, if any, is then output as the output gaze region, or the three-dimensional surface at which the subject is currently looking. Data describing the set of three-dimensional regions may be input to, and stored in or accessible by, the mapping module 250. In this manner, any set of three-dimensional regions describing any one or more objects can be input to the mapping module 250, and mapping module 250 may determine the intersection of projected gaze vectors with any stored three-dimensional regions. This allows the system of FIG. 2A to determine gaze direction relative to any three-dimensional regions representing any object or objects. Furthermore, the system need not re-train its machine learning models for each different object. Rather, a new set of three-dimensional regions may simply be made available to the mapping module 250, and module 250 may determine intersections of gaze direction with these new three-dimensional regions without retraining of its machine learning models.

The three-dimensional regions may be any three-dimensional representations determined in any manner. For example, the three-dimensional regions may be determined by directly measuring the spatial locations of various points of one or more objects. The three-dimensional regions may also be determined by adapting a CAD model or other computer based three dimensional model of one or more objects that contains position information of various locations of the objects. This approach is suitable for use with complex three-dimensional geometries, such as the interior of a vehicle, which are difficult or cumbersome to measure directly. Another approach is to determine locations of points or regions of an object using one or more sensors capable of communicating position information, such as image sensors, distance or position sensors, or the like. For example, sensors may capture images of that object (of any wavelength, including visible light images, infrared images, etc.) and locations of points or regions of the object may be determined therefrom in any manner. A further approach employs one or more known machine learning models trained to select and determine positions and orientations of regions of an object from input such as images of the object.

Figure 2B:
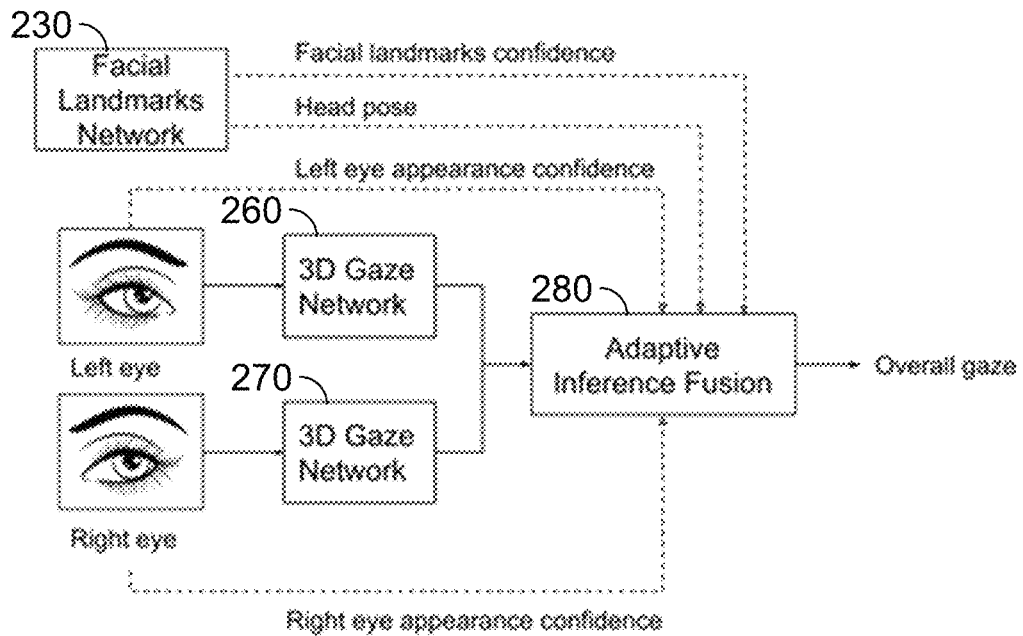
FIG. 2B is a block diagram illustrating further details of the gaze vector estimation module of FIG. 2A.

FIG. 2B is a block diagram illustrating further details of the gaze vector estimation module 220. In one embodiment, the gaze vector estimation module 220 includes an adaptive inference fusion module 280 that implements a regression model as described above. The regression model takes as input variables a set of facial landmarks describing subject head pose, a set of confidence values corresponding to the facial landmarks, a left eye gaze direction, a right eye gaze direction, and corresponding confidence values for each eye gaze direction. Gaze direction is then output according to a regression scheme, as described above. The facial landmarks and associated confidence values may be determined according to any suitable method or system.

The eye gaze networks 260, 270 shown take as input crops of the subject's left and right eyes, and output estimates of gaze directions for each eye. Eye crops may be determined by locating the subject's eyes in the image from the camera 200, and cropping the image accordingly. Eye location can be carried out in any manner, such as by known computer vision-based eye detection processes including any of the above non-neural network based techniques, neural network-based eye recognition methods, and the like. Eye location according to these processes may generate confidence values corresponding to a degree of certainty that the eye has been correctly identified, and these confidence values may also be input to the adaptive inference fusion module. Eye gaze networks 260, 270 may be any network capable of determining eye gaze from input eye crops.

The adaptive inference fusion module 280 may implement any regression model or models suitable for determining gaze vectors, as described above. The gaze vector output from the adaptive inference fusion module 280 is then transmitted to the gaze region mapping module 250 for mapping of the gaze vector onto a three-dimensional geometry. It can be observed that any three-dimensional geometry, or set of surfaces, may be stored for use by computing system 300. Accordingly, the system of FIGS. 2A and 2B may determine the intersection of a subject's gaze with any set of surfaces. Embodiments of the disclosure thus allow an efficient and modular approach for determining the region of gaze of a subject in any environment. By characterizing any environment as a set of three-dimensional surfaces and storing those surfaces in, e.g., storage 408, the system of FIGS. 2A and 2B may determine which portion of the environment occupies the subject's attention at any time. If the subject changes his or her environment, any interaction with this new environment may be determined by inputting the surfaces of the new environment for use by the system of FIGS. 2A and 2B.

This system may be applied to any environment. As one example, the environment may be the cabin of a vehicle, and the system of FIGS. 2A and 2B may be used to determine the portion or region of the vehicle to which the driver is currently directing his or her attention. In this example, the above-described camera 200 may be installed in the vehicle to capture images of a vehicle occupant's face. Embodiments of the disclosure may determine the gaze vector and origin point of the vehicle occupant's gaze. Relevant portions of the vehicle's cabin may be identified and characterized as three-dimensional surfaces, as shown in FIG. 2A. These surfaces may include, for instance, left and right front windshields, left and right exteriors (e.g., side windows), the vehicle's information cluster, and the vehicle's entertainment center. As above, the system of FIGS. 2A and 2B may then determine which of these surfaces, if any, that the determined gaze vector intersects, and take one or more actions accordingly. For instance, upon determining that the vehicle occupant is the driver of the vehicle and determining that the driver is looking toward the information cluster, the vehicle may project certain important information or warnings onto the information cluster, or highlight certain readings or indicators. As another example, upon determining that the driver has been looking at a region other than the left front windshield for more than a threshold amount of time, the vehicle may initiate a warning to the driver to focus on the road. Embodiments of the disclosure contemplate any actions initiated in response to determined gaze region.

Figure 3:
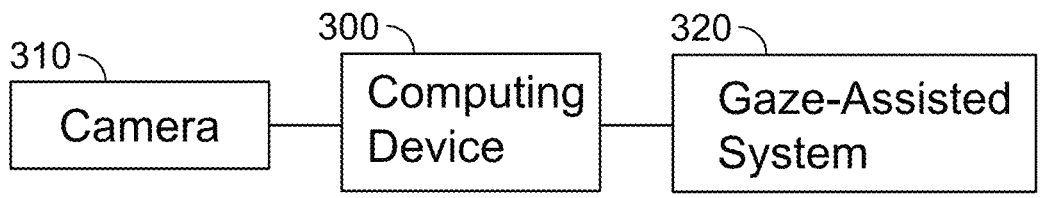
FIG. 3 is a generalized embodiment of an illustrative electronic computing system constructed for use according to embodiments of the disclosure.

FIG. 3 is a block diagram representation of one exemplary gaze determination system of embodiments of the disclosure. Here, computing device 300, which may be any electronic computing device containing processing circuitry capable of carrying out the gaze determination and mapping operations of embodiments of the disclosure, is in electronic communication with both a camera 310 and a gaze-assisted system 320. In operation, camera 310, which may correspond to camera 200 of FIG. 2A, captures and transmits images of a subject to computing device 300, which then implements the machine learning models of, e.g., FIGS. 2A-2B, determining from the image of camera 310 an output gaze vector and determining its intersection with a particular spatial region. The computing device 300 transmits this intersection information to gaze-assisted system 320, which takes an action or performs one or more operations in response.

Gaze-assisted system 320 may be any system capable of performing one or more actions based on the spatial region intersection information it receives from computing device 300, such as initiating operations of systems that correspond to the spatial regions intersected. Any configurations of camera 310, computing device 300, and gaze-assisted system 320 are contemplated. As one example, the gaze-assisted system 320 may be an autonomous vehicle capable of determining and reacting to the gaze direction of the driver or another passenger, such as the autonomous vehicle of FIGS. 4A-4D described further below. In this example, camera 310 and computing device 300 may be positioned within the vehicle, while the gaze-assisted system 320 may represent the vehicle itself. Camera 310 may be positioned at any location within the vehicle that allows it a view of the driver or passenger. Accordingly, camera 310 may capture images of the driver and transmit them to computing device 300, which calculates corresponding subject gaze vectors and determines their intersections with spatial regions corresponding to portions of the vehicle. This intersection information may then be transmitted to, for example, another software module that determines actions the vehicle may take in response. For instance, the vehicle may determine that the gaze direction intersects a side window, thus representing a distracted driver or a driver that is not paying attention to the road, and may initiate any type of operation in response. Such operations may include any type of warning issued to the driver (e.g., a visual or audible warning, a warning on a heads-up display, or the like), auto-pilot initiation, a braking or turning operation, or any other action. Computing device 300 may be positioned within the vehicle of gaze-assisted system 320 as a local processor, or may be a remote processor that receives images from camera 310 and transmits intersection information or instructions wirelessly to the vehicle of gaze-assisted system 320.

As another example, gaze-assisted system 320 may be a virtual reality or augmented reality system capable of displaying images responsive to motion and gaze of users. In this example, gaze-assisted system 320 includes a virtual reality or augmented reality display, such as a headset worn by a user and configured to project images thereto. Camera 310 and computing device 300 may be positioned within the headset, with camera 310 capturing images of the eyes of the user and computing device 300 determining landmark and confidence values, as well as his or her gaze direction therefrom. This gaze direction may then be projected onto a set of retrieved spatial regions within the virtual environment, and the system 320 may take various actions based on the specific spatial regions upon which the user may be gazing. For example, the spatial regions may represent virtual objects that may respond to the user's gaze, such as heads-up display regions that may display information to the user when the user is gazing upon them. As with the autonomous vehicle example above, computing device 300 of a virtual reality or augmented reality system may be located within system 320, e.g., within the headset itself, or may be located remotely so that images are transmitted wirelessly to computing device 300 and calculated gaze directions may be transmitted wirelessly back to the headset, which in turn may perform various operations in response.

As yet another example, gaze-assisted system 320 may be a computer-based advertising system that determines which ads a user is looking at. More specifically, gaze-assisted system 320 may be any electronic computing system or device, such as a desktop computer, a laptop computer, a smartphone, a server computer, or the like. Camera 310 and computing device 300 may be incorporated into this system so that camera 310 detects the user when he or she is gazing into or proximate to the display of the computing device. Camera 310 may capture images of the user and computing device 300 may determine his or her gaze direction therefrom. Determined gaze directions can then be transmitted to gaze-assisted system 320, e.g., computing device 300 displaying advertisements for the user, a remote computing device, or the like. The computing device 300 may then retrieve stored spatial regions, where each region may correspond to a particular portion of the display of system 320. The calculated gaze direction may then be used to determine which region the gaze vector intersects, i.e., which ad the user is focusing on, providing information on the effectiveness of various ads.

Gaze-assisted system 320 may further act as a user interface system for controlling any computing system. As above, spatial regions corresponding to the display of a computing device may be used to determine a user's gaze upon any regions of a displayed computing output. In this manner, system 320 may function as a graphical or visual user interface system similar to a computer mouse or touchpad, whereby the user may move a cursor and select items according to the location at which he or she is gazing. That is, users may move a cursor or other item selection icon by gazing at different areas of displayed information. Users may also use their gaze to select items (such as by gazing at corresponding spatial regions for more than a predetermined period of time), select/press buttons, and perform any other user inputs to a computing system. Embodiments of the disclosure contemplate use of any stored spatial regions arranged according to regions of any displayed computing output, for selecting portions of computing output according to user gaze direction.

Figure 4A:
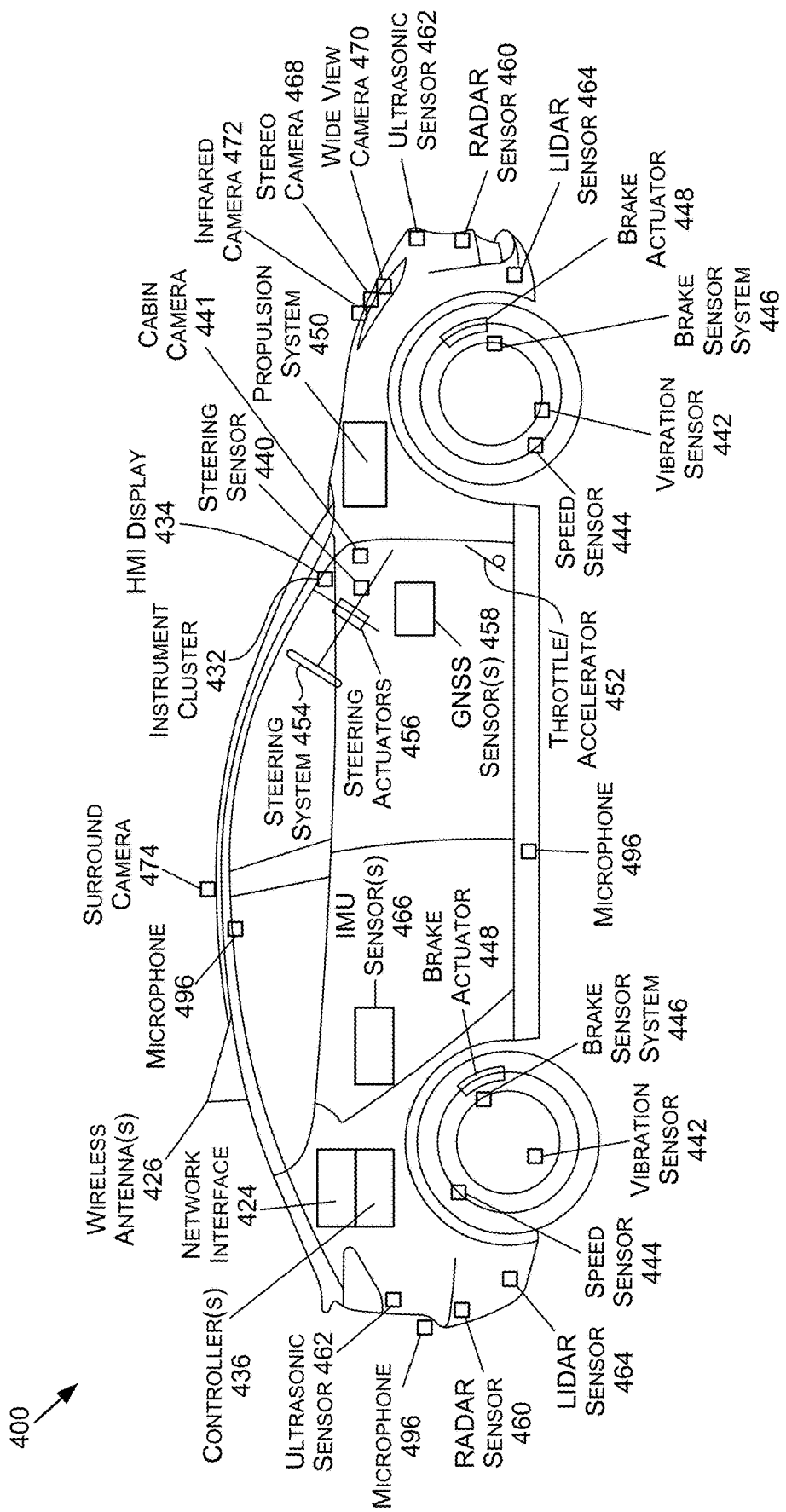
FIG. 4A is an illustration of an example autonomous vehicle, in accordance with some embodiments of the present disclosure.

FIG. 4A is an illustration of an example autonomous vehicle 400, in accordance with some embodiments of the present disclosure. The autonomous vehicle 400 (alternatively referred to herein as the "vehicle 400") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 400 may be capable of functionality in accordance with one or more of Level 3-Level 5 of the autonomous driving levels. For example, the vehicle 400 may be capable of conditional automation (Level 3), high automation (Level 4), and/or full automation (Level 5), depending on the embodiment.

The vehicle 400 may include components such as a chassis, a vehicle body, wheels (e.g., 2, 4, 6, 8, 18, etc.), tires, axles, and other components of a vehicle. The vehicle 400 may include a propulsion system 450, such as an internal combustion engine, hybrid electric power plant, an all-electric engine, and/or another propulsion system type. The propulsion system 450 may be connected to a drive train of the vehicle 400, which may include a transmission, to enable the propulsion of the vehicle 400. The propulsion system 450 may be controlled in response to receiving signals from the throttle/accelerator 452.

A steering system 454, which may include a steering wheel, may be used to steer the vehicle 400 (e.g., along a desired path or route) when the propulsion system 450 is operating (e.g., when the vehicle is in motion). The steering system 454 may receive signals from a steering actuator 456. The steering wheel may be optional for full automation (Level 5) functionality.

The brake sensor system 446 may be used to operate the vehicle brakes in response to receiving signals from the brake actuators 448 and/or brake sensors.

Controller(s) 436, which may include one or more CPU(s), system on chips (SoCs) 404 (FIG. 4C) and/or GPU(s), may provide signals (e.g., representative of commands) to one or more components and/or systems of the vehicle 400. For example, the controller(s) may send signals to operate the vehicle brakes via one or more brake actuators 448, to operate the steering system 454 via one or more steering actuators 456, and/or to operate the propulsion system 450 via one or more throttle/accelerators 452. The controller(s) 436 may include one or more onboard (e.g., integrated) computing devices (e.g., supercomputers) that process sensor signals, and output operation commands (e.g., signals representing commands) to enable autonomous driving and/or to assist a human driver in driving the vehicle 400. The controller(s) 436 may include a first controller 436 for autonomous driving functions, a second controller 436 for functional safety functions, a third controller 436 for artificial intelligence functionality (e.g., computer vision), a fourth controller 436 for infotainment functionality, a fifth controller 436 for redundancy in emergency conditions, and/or other controllers. In some examples, a single controller 436 may handle two or more of the above functionalities, two or more controllers 436 may handle a single functionality, and/or any combination thereof.

The controller(s) 436 may provide the signals for controlling one or more components and/or systems of the vehicle 400 in response to sensor data received from one or more sensors (e.g., sensor inputs). The sensor data may be received from, for example and without limitation, global navigation satellite systems sensor(s) 458 (e.g., Global Positioning System sensor(s)), RADAR sensor(s) 460, ultrasonic sensor(s) 462, LIDAR sensor(s) 464, inertial measurement unit (IMU) sensor(s) 466 (e.g., accelerometer(s), gyroscope(s), magnetic compass(es), magnetometer(s), etc.), microphone(s) 496, stereo camera(s) 468, wide-view camera(s) 470 (e.g., fisheye cameras), infrared camera(s) 472, surround camera(s) 474 (e.g., 360 degree cameras), long-range and/or mid-range camera(s) 498, speed sensor(s) 444 (e.g., for measuring the speed of the vehicle 400), vibration sensor(s) 442, steering sensor(s) 440, brake sensor(s) 446 (e.g., as part of the brake sensor system 446), and/or other sensor types.

One or more of the controller(s) 436 may receive inputs (e.g., represented by input data) from an instrument cluster 432 of the vehicle 400 and provide outputs (e.g., represented by output data, display data, etc.) via a human-machine interface (HMI) display 434, an audible annunciator, a loudspeaker, and/or via other components of the vehicle 400. The outputs may include information such as vehicle velocity, speed, time, map data (e.g., the HD map 422 of FIG. 4C), location data (e.g., the location of the vehicle 400, such as on a map), direction, location of other vehicles (e.g., an occupancy grid), information about objects and status of objects as perceived by the controller(s) 436, etc. For example, the HMI display 434 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 400 further includes a network interface 424, which may use one or more wireless antenna(s) 426 and/or modem(s) to communicate over one or more networks. For example, the network interface 424 may be capable of communication over LTE, WCDMA, UMTS, GSM, CDMA2000, etc. The wireless antenna(s) 426 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 4B:
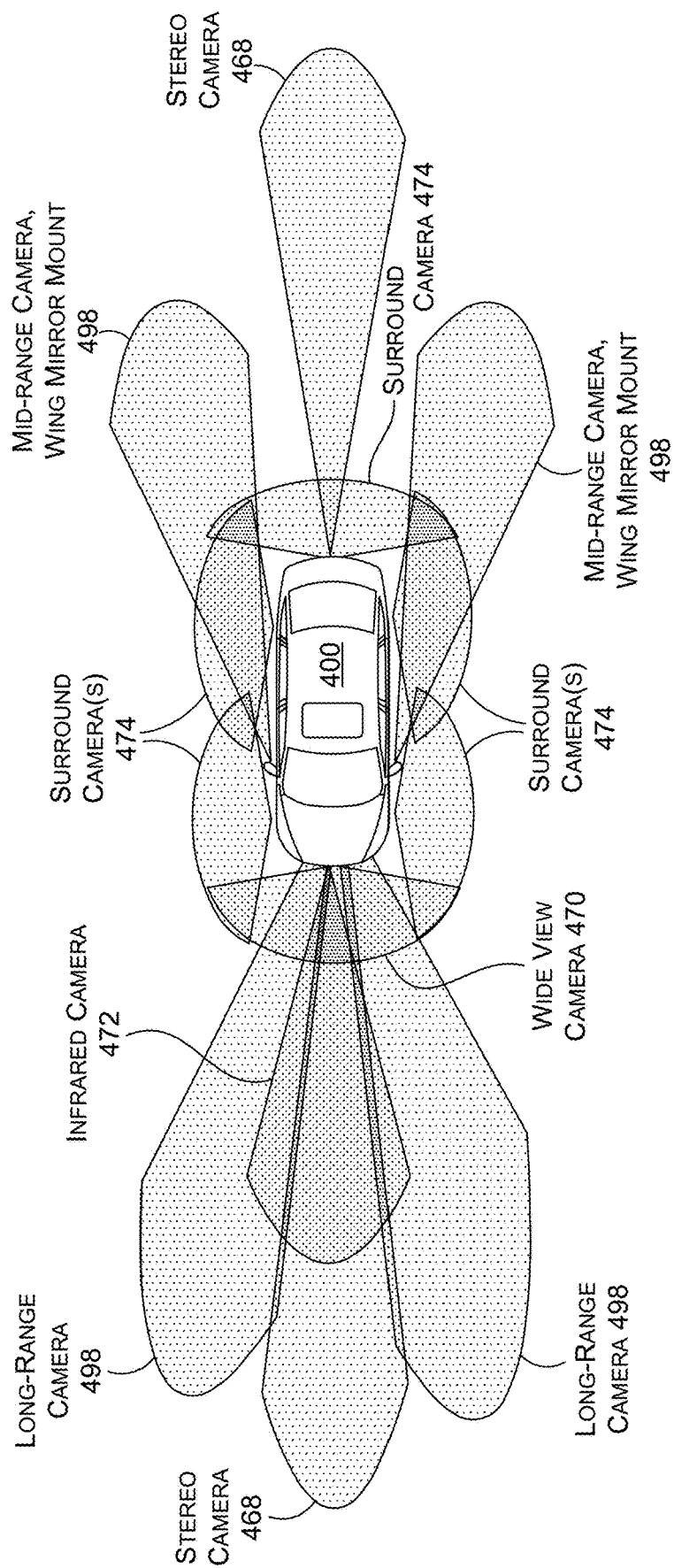
FIG. 4B is an example of camera locations and fields of view for the example autonomous vehicle of FIG. 4A, in accordance with some embodiments of the present disclosure.

FIG. 4B is an example of camera locations and fields of view for the example autonomous vehicle 400 of FIG. 4A, in accordance with some embodiments of the present disclosure. The cameras and respective fields of view are one example embodiment and are not intended to be limiting. For example, additional and/or alternative cameras may be included and/or the cameras may be located at different locations on the vehicle 400.

The camera types for the cameras may include, but are not limited to, digital cameras that may be adapted for use with the components and/or systems of the vehicle 400. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that includes portions of the environment in front of the vehicle 400 (e.g., front-facing cameras) may be used for surround view, to help identify forward-facing paths and obstacles, as well aid in, with the help of one or more controllers 436 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 470 that may be used to perceive objects coming into view from the periphery (e.g., pedestrians, crossing traffic or bicycles). Although only one wide-view camera is illustrated in FIG. 4B, there may any number of wide-view cameras 470 on the vehicle 400. In addition, long-range camera(s) 498 (e.g., a long-view stereo camera pair) may be used for depth-based object detection, especially for objects for which a neural network has not yet been trained. The long-range camera(s) 498 may also be used for object detection and classification, as well as basic object tracking.

One or more stereo cameras 468 may also be included in a front-facing configuration. The stereo camera(s) 468 may include an integrated control unit comprising a scalable processing unit, which may provide a programmable logic (e.g., FPGA) and a multi-core microprocessor with an integrated CAN or Ethernet interface on a single chip. Such a unit may be used to generate a 3-D map of the vehicle's environment, including a distance estimate for all the points in the image. An alternative stereo camera(s) 468 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 468 may be used in addition to, or alternatively from, those described herein.

Cameras with a field of view that includes portions of the environment to the side of the vehicle 400 (e.g., side-view cameras) may be used for surround view, providing information used to create and update the occupancy grid, as well as to generate side impact collision warnings. For example, surround camera(s) 474 (e.g., four surround cameras 474 as illustrated in FIG. 4B) may be positioned around the vehicle 400. The surround camera(s) 474 may include wide-view camera(s) 470, fisheye camera(s), 360-degree camera(s), and/or the like. For example, four fisheye cameras may be positioned on the vehicle's front, rear, and sides. In an alternative arrangement, the vehicle may use three surround camera(s) 474 (e.g., left, right, and rear), and may leverage one or more other camera(s) (e.g., a forward-facing camera) as a fourth surround-view camera.

Cameras with a field of view that include portions of the environment to the rear of the vehicle 400 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 498, stereo camera(s) 468), infrared camera(s) 472, etc.), as described herein.

Cameras with a field of view that include portions of the interior or cabin of vehicle 400 may be used to monitor one or more states of drivers, passengers, or objects in the cabin. Any type of camera may be used including, but not limited to, cabin camera(s) 441, which may be any type of camera described herein, and which may be placed anywhere on or in vehicle 400 that provides a view of the cabin or interior thereof. For example, cabin camera(s) 441 may be placed within or on some portion of the vehicle 400 dashboard, rear view mirror, side view mirrors, seats, or doors and oriented to capture images of any drivers, passengers, or any other object or portion of the vehicle 400.

Figure 4C:
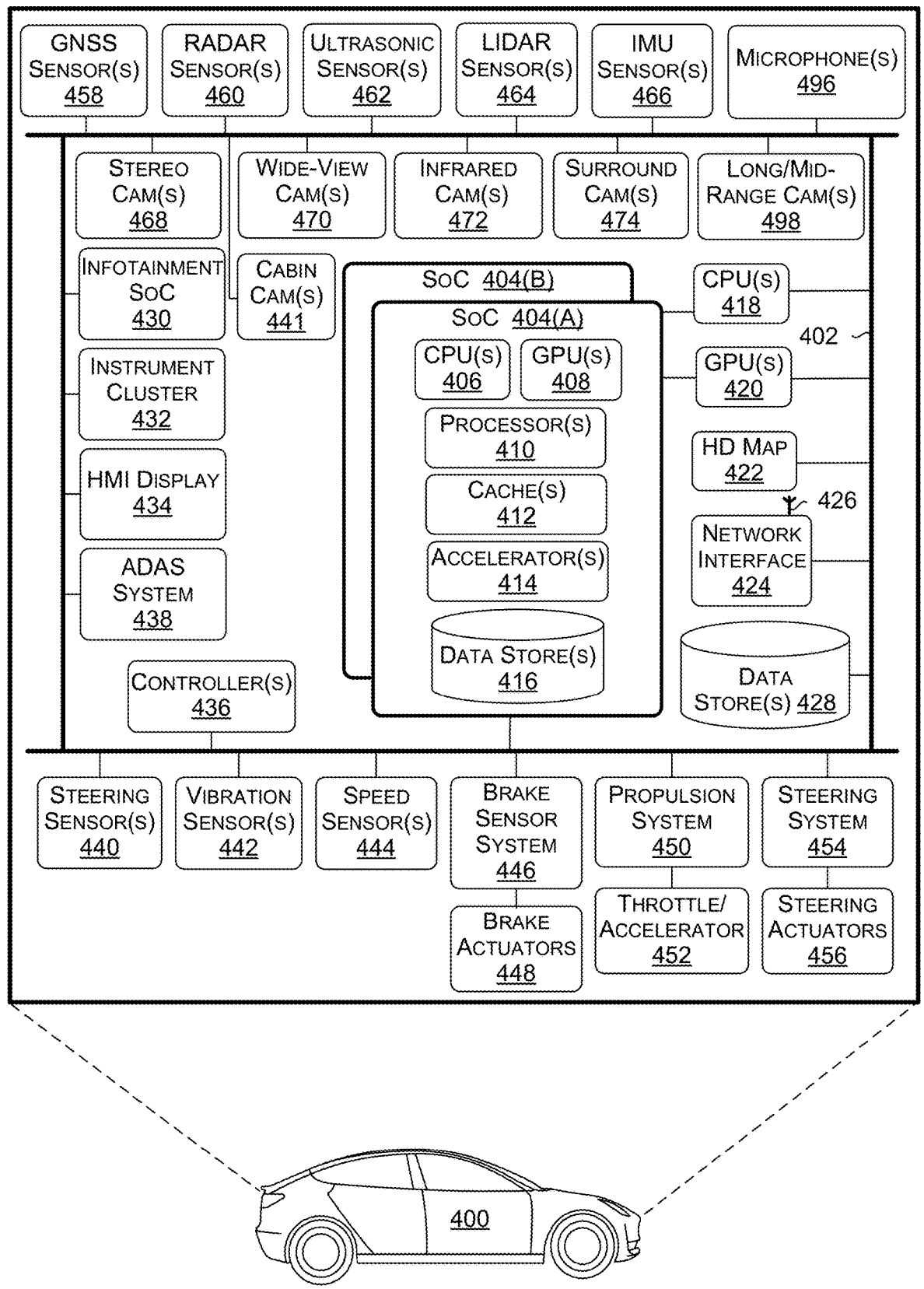
FIG. 4C is a block diagram of an example system architecture for the example autonomous vehicle of FIG. 4A, in accordance with some embodiments of the present disclosure.

FIG. 4C is a block diagram of an example system architecture for the example autonomous vehicle 400 of FIG. 4A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 400 in FIG. 4C is illustrated as being connected via bus 402. The bus 402 may include a Controller Area Network (CAN) data interface (alternatively referred to herein as a "CAN bus"). A CAN may be a network inside the vehicle 400 used to aid in control of various features and functionality of the vehicle 400, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 402 is described herein as being a CAN bus, this is not intended to be limiting. For example, in addition to, or alternatively from, the CAN bus, FlexRay and/or Ethernet may be used. Additionally, although a single line is used to represent the bus 402, this is not intended to be limiting. For example, there may be any number of busses 402, which may include one or more CAN busses, one or more FlexRay busses, one or more Ethernet busses, and/or one or more other types of busses using a different protocol. In some examples, two or more busses 402 may be used to perform different functions, and/or may be used for redundancy. For example, a first bus 402 may be used for collision avoidance functionality and a second bus 402 may be used for actuation control. In any example, each bus 402 may communicate with any of the components of the vehicle 400, and two or more busses 402 may communicate with the same components. In some examples, each SoC 404, each controller 436, and/or each computer within the vehicle may have access to the same input data (e.g., inputs from sensors of the vehicle 400), and may be connected to a common bus, such the CAN bus.

The vehicle 400 may include one or more controller(s) 436, such as those described herein with respect to FIG. 4A. The controller(s) 436 may be used for a variety of functions. The controller(s) 436 may be coupled to any of the various other components and systems of the vehicle 400 and may be used for control of the vehicle 400, artificial intelligence of the vehicle 400, infotainment for the vehicle 400, and/or the like.

The vehicle 400 may include a system(s) on a chip (SoC) 404. The SoC 404 may include CPU(s) 406, GPU(s) 408, processor(s) 410, cache(s) 412, accelerator(s) 414, data store(s) 416, and/or other components and features not illustrated. The SoC(s) 404 may be used to control the vehicle 400 in a variety of platforms and systems. For example, the SoC(s) 404 may be combined in a system (e.g., the system of the vehicle 400) with an HD map 422 which may obtain map refreshes and/or updates via a network interface 424 from one or more servers (e.g., server(s) 478 of FIG. 4D).

The CPU(s) 406 may include a CPU cluster or CPU complex (alternatively referred to herein as a "CCPLEX"). The CPU(s) 406 may include multiple cores and/or L2 caches. For example, in some embodiments, the CPU(s) 406 may include eight cores in a coherent multi-processor configuration. In some embodiments, the CPU(s) 406 may include four dual-core clusters where each cluster has a dedicated L2 cache (e.g., a 2 MB L2 cache). The CPU(s) 406 (e.g., the CCPLEX) may be configured to support simultaneous cluster operation enabling any combination of the clusters of the CPU(s) 406 to be active at any given time.

The CPU(s) 406 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 406 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 408 may include an integrated GPU (alternatively referred to herein as an "iGPU"). The GPU(s) 408 may be programmable and may be efficient for parallel workloads. The GPU(s) 408, in some examples, may use an enhanced tensor instruction set. The GPU(s) 408 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 408 may include at least eight streaming microprocessors. The GPU(s) 408 may use computer-based application programming interface(s) (API(s)). In addition, the GPU(s) 408 may use one or more parallel computing platforms and/or programming models (e.g., NVIDIA's CUDA).

The GPU(s) 408 may be power-optimized for best performance in automotive and embedded use cases. For example, the GPU(s) 408 may be fabricated on a Fin field-effect transistor (FinFET). However, this is not intended to be limiting, and the GPU(s) 408 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 408 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 408 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 408 to access the CPU(s) 406 page tables directly. In such examples, when the GPU(s) 408 memory management unit (MMU) experiences a miss, an address translation request may be transmitted to the CPU(s) 406. In response, the CPU(s) 406 may look in its page tables for the virtual-to-physical mapping for the address and transmits the translation back to the GPU(s) 408. As such, unified memory technology may allow a single unified virtual address space for memory of both the CPU(s) 406 and the GPU(s) 408, thereby simplifying the GPU(s) 408 programming and porting of applications to the GPU(s) 408.

In addition, the GPU(s) 408 may include an access counter that may keep track of the frequency of access of the GPU(s) 408 to memory of other processors. The access counter may help ensure that memory pages are moved to the physical memory of the processor that is accessing the pages most frequently.

The SoC(s) 404 may include any number of cache(s) 412, including those described herein. For example, the cache(s) 412 may include an L3 cache that is available to both the CPU(s) 406 and the GPU(s) 408 (e.g., that is connected to both the CPU(s) 406 and the GPU(s) 408). The cache(s) 412 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 404 may include an arithmetic logic unit(s) (ALU(s)) which may be leveraged in performing processing with respect to any of the variety of tasks or operations of the vehicle 400—such as processing DNNs. In addition, the SoC(s) 404 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 406 and/or GPU(s) 408.

The SoC(s) 404 may include one or more accelerators 414 (e.g., hardware accelerators, software accelerators, or a combination thereof). For example, the SoC(s) 404 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 408 and to off-load some of the tasks of the GPU(s) 408 (e.g., to free up more cycles of the GPU(s) 408 for performing other tasks). As an example, the accelerator(s) 414 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 414 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 408, and by using an inference accelerator, for example, a designer may target either the DLA(s) or the GPU(s) 408 for any function. For example, the designer may focus processing of CNNs and floating point operations on the DLA(s) and leave other functions to the GPU(s) 408 and/or other accelerator(s) 414.

The accelerator(s) 414 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 406. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 414 (e.g., the hardware acceleration cluster) may include a computer vision network on-chip and SRAM, for providing a high-bandwidth, low latency SRAM for the accelerator(s) 414. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 404 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 414 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. For example, the PVA may be used to process raw RADAR data (e.g., using a 4D Fast Fourier Transform) to provide a processed RADAR signal before emitting the next RADAR pulse. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence exceed and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 466 output that correlates with the vehicle 400 orientation, distance, 3D location estimates of the object obtained from the neural network and/or other sensors (e.g., LIDAR sensor(s) 464 or RADAR sensor(s) 460), among others.

The SoC(s) 404 may include data store(s) 416 (e.g., memory). The data store(s) 416 may be on-chip memory of the SoC(s) 404, which may store neural networks to be executed on the GPU and/or the DLA. In some examples, the data store(s) 416 may be large enough in capacity to store multiple instances of neural networks for redundancy and safety. The data store(s) 416 may comprise L2 or L3 cache(s) 412. Reference to the data store(s) 416 may include reference to the memory associated with the PVA, DLA, and/or other accelerator(s) 414, as described herein.

The SoC(s) 404 may include one or more processor(s) 410 (e.g., embedded processors). The processor(s) 410 may include a boot and power management processor that may be a dedicated processor and subsystem to handle boot power and management functions and related security enforcement. The boot and power management processor may be a part of the SoC(s) 404 boot sequence and may provide runtime power management services. The boot power and management processor may provide clock and voltage programming, assistance in system low power state transitions, management of SoC(s) 404 thermals and temperature sensors, and/or management of the SoC(s) 404 power states. Each temperature sensor may be implemented as a ring-oscillator whose output frequency is proportional to temperature, and the SoC(s) 404 may use the ring-oscillators to detect temperatures of the CPU(s) 406, GPU(s) 408, and/or accelerator(s) 414. If temperatures are determined to exceed a threshold, the boot and power management processor may enter a temperature fault routine and put the SoC(s) 404 into a lower power state and/or put the vehicle 400 into a chauffeur to safe-stop mode (e.g., bring the vehicle 400 to a safe stop).

The processor(s) 410 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 410 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 410 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 410 may further include a real-time camera engine that may include a dedicated processor subsystem for handling real-time camera management.

The processor(s) 410 may further include a high dynamic range signal processor that may include an image signal processor that is a hardware engine that is part of the camera processing pipeline.

The processor(s) 410 may include a video image compositor that may be a processing block (e.g., implemented on a microprocessor) that implements video post-processing functions needed by a video playback application to produce the final image for the player window. The video image compositor may perform lens distortion correction on wide-view camera(s) 470, surround camera(s) 474, and/or on in-cabin monitoring camera sensors. An in-cabin monitoring camera sensor is preferably monitored by a neural network running on another instance of the advanced SoC, configured to identify in-cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 408 is not required to continuously render new surfaces. Even when the GPU(s) 408 is powered on and actively performing 3D rendering, the video image compositor may be used to offload the GPU(s) 408 to improve performance and responsiveness.

The SoC(s) 404 may further include a mobile industry processor interface (MIPI) camera serial interface for receiving video and input from cameras, a high-speed interface, and/or a video input block that may be used for camera and related pixel input functions. The SoC(s) 404 may further include an input/output controller(s) that may be controlled by software and may be used for receiving I/O signals that are uncommitted to a specific role.

The SoC(s) 404 may further include a broad range of peripheral interfaces to enable communication with peripherals, audio codecs, power management, and/or other devices. The SoC(s) 404 may be used to process data from cameras (e.g., connected over Gigabit Multimedia Serial Link and Ethernet), sensors (e.g., LIDAR sensor(s) 464, RADAR sensor(s) 460, etc. that may be connected over Ethernet), data from bus 402 (e.g., speed of vehicle 400, steering wheel position, etc.), data from GNSS sensor(s) 458 (e.g., connected over Ethernet or CAN bus). The SoC(s) 404 may further include dedicated high-performance mass storage controllers that may include their own DMA engines, and that may be used to free the CPU(s) 406 from routine data management tasks.

The SoC(s) 404 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 404 may be faster, more reliable, and even more energy-efficient and space-efficient than conventional systems. For example, the accelerator(s) 414, when combined with the CPU(s) 406, the GPU(s) 408, and the data store(s) 416, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 420) may include a text and word recognition, allowing the supercomputer to read and understand traffic signs, including signs for which the neural network has not been specifically trained. The DLA may further include a neural network that is able to identify, interpret, and provide semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 408.

In some examples, a CNN for facial recognition and vehicle owner identification may use data from camera sensors to identify the presence of an authorized driver and/or owner of the vehicle 400. The always-on sensor processing engine may be used to unlock the vehicle when the owner approaches the driver door and turn on the lights, and, in security mode, to disable the vehicle when the owner leaves the vehicle. In this way, the SoC(s) 404 provide for security against theft and/or carjacking.

In another example, a CNN for emergency vehicle detection and identification may use data from microphones 496 to detect and identify emergency vehicle sirens. In contrast to conventional systems, which use general classifiers to detect sirens and manually extract features, the SoC(s) 404 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 458. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 462, until the emergency vehicle(s) passes.

The vehicle may include a CPU(s) 418 (e.g., discrete CPU(s), or dCPU(s)), that may be coupled to the SoC(s) 404 via a high-speed interconnect (e.g., PCIe). The CPU(s) 418 may include an X86 processor, for example. The CPU(s) 418 may be used to perform any of a variety of functions, including arbitrating potentially inconsistent results between ADAS sensors and the SoC(s) 404, and/or monitoring the status and health of the controller(s) 436 and/or infotainment SoC 430, for example.

The vehicle 400 may include a GPU(s) 420 (e.g., discrete GPU(s), or dGPU(s)), that may be coupled to the SoC(s) 404 via a high-speed interconnect (e.g., NVIDIA's NVLINK). The GPU(s) 420 may provide additional artificial intelligence functionality, such as by executing redundant and/or different neural networks, and may be used to train and/or update neural networks based on input (e.g., sensor data) from sensors of the vehicle 400.

The vehicle 400 may further include the network interface 424 which may include one or more wireless antennas 426 (e.g., one or more wireless antennas for different communication protocols, such as a cellular antenna, a Bluetooth antenna, etc.). The network interface 424 may be used to enable wireless connectivity over the Internet with the cloud (e.g., with the server(s) 478 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 400 information about vehicles in proximity to the vehicle 400 (e.g., vehicles in front of, on the side of, and/or behind the vehicle 400). This functionality may be part of a cooperative adaptive cruise control functionality of the vehicle 400.

The network interface 424 may include an SoC that provides modulation and demodulation functionality and enables the controller(s) 436 to communicate over wireless networks. The network interface 424 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols. The vehicle 400 may further include data store(s) 428, which may include off-chip (e.g., off the SoC(s) 404) storage. The data store(s) 428 may include one or more storage elements including RAM, SRAM, DRAM, VRAM, Flash, hard disks, and/or other components and/or devices that may store at least one bit of data.

The vehicle 400 may further include GNSS sensor(s) 458 (e.g., GPS and/or assisted GPS sensors), to assist in mapping, perception, occupancy grid generation, and/or path planning functions. Any number of GNSS sensor(s) 458 may be used, including, for example and without limitation, a GPS using a USB connector with an Ethernet to serial (RS-232) bridge. The vehicle 400 may further include RADAR sensor(s) 460. The RADAR sensor(s) 460 may be used by the vehicle 400 for long-range vehicle detection, even in darkness and/or severe weather conditions. RADAR functional safety levels may be ASIL B. The RADAR sensor(s) 460 may use the CAN and/or the bus 402 (e.g., to transmit data generated by the RADAR sensor(s) 460) for control and to access object tracking data, with access to Ethernet to access raw data, in some examples. A wide variety of RADAR sensor types may be used. For example, and without limitation, the RADAR sensor(s) 460 may be suitable for front, rear, and side RADAR use. In some example, Pulse Doppler RADAR sensor(s) are used.

The RADAR sensor(s) 460 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 460 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the surrounding of the vehicle 400 at higher speeds with minimal interference from traffic in adjacent lanes. The other two antennae may expand the field of view, making it possible to quickly detect vehicles entering or leaving the vehicle's 400 lane.

Mid-range RADAR systems may include, as an example, a range of up to 460 m (front) or 80 m (rear), and a field of view of up to 42 degrees (front) or 450 degrees (rear). Short-range RADAR systems may include, without limitation, RADAR sensors designed to be installed at both ends of the rear bumper. When installed at both ends of the rear bumper, such a RADAR sensor system may create two beams that constantly monitor the blind spot in the rear and next to the vehicle.

Short-range RADAR systems may be used in an ADAS system for blind spot detection and/or lane change assist.

The vehicle 400 may further include ultrasonic sensor(s) 462. The ultrasonic sensor(s) 462, which may be positioned at the front, back, and/or the sides of the vehicle 400, may be used for park assist and/or to create and update an occupancy grid. A wide variety of ultrasonic sensor(s) 462 may be used, and different ultrasonic sensor(s) 462 may be used for different ranges of detection (e.g., 2.5 m, 4 m). The ultrasonic sensor(s) 462 may operate at functional safety levels of ASIL B.

The vehicle 400 may include LIDAR sensor(s) 464. The LIDAR sensor(s) 464 may be used for object and pedestrian detection, emergency braking, collision avoidance, and/or other functions. The LIDAR sensor(s) 464 may be functional safety level ASIL B. In some examples, the vehicle 400 may include multiple LIDAR sensors 464 (e.g., two, four, six, etc.) that may use Ethernet (e.g., to provide data to a Gigabit Ethernet switch).

In some examples, the LIDAR sensor(s) 464 may be capable of providing a list of objects and their distances for a 360-degree field of view. Commercially available LIDAR sensor(s) 464 may have an advertised range of approximately 100 m, with an accuracy of 2 cm-3 cm, and with support for a 100 Mbps Ethernet connection, for example. In some examples, one or more non-protruding LIDAR sensors 464 may be used. In such examples, the LIDAR sensor(s) 464 may be implemented as a small device that may be embedded into the front, rear, sides, and/or corners of the vehicle 400. The LIDAR sensor(s) 464, in such examples, may provide up to a 120-degree horizontal and 35-degree vertical field-of-view, with a 200 m range even for low-reflectivity objects. Front-mounted LIDAR sensor(s) 464 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 400. Available 3D flash LIDAR systems include a solid-state 3D staring array LIDAR camera with no moving parts other than a fan (e.g., a non-scanning LIDAR device). The flash LIDAR device may use a five nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 464 may be less susceptible to motion blur, vibration, and/or shock.

The vehicle may further include IMU sensor(s) 466. The IMU sensor(s) 466 may be located at a center of the rear axle of the vehicle 400, in some examples. The IMU sensor(s) 466 may include, for example and without limitation, an accelerometer(s), a magnetometer(s), a gyroscope(s), a magnetic compass(es), and/or other sensor types. In some examples, such as in six-axis applications, the IMU sensor(s) 466 may include accelerometers and gyroscopes, while in nine-axis applications, the IMU sensor(s) 466 may include accelerometers, gyroscopes, and magnetometers.

In some embodiments, the IMU sensor(s) 466 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 466 may enable the vehicle 400 to estimate heading without requiring input from a magnetic sensor by directly observing and correlating the changes in velocity from GPS to the IMU sensor(s) 466. In some examples, the IMU sensor(s) 466 and the GNSS sensor(s) 458 may be combined in a single integrated unit.

The vehicle may include microphone(s) 496 placed in and/or around the vehicle 400. The microphone(s) 496 may be used for emergency vehicle detection and identification, among other things.

The vehicle may further include any number of camera types, including stereo camera(s) 468, wide-view camera(s) 470, infrared camera(s) 472, surround camera(s) 474, long-range and/or mid-range camera(s) 498, and/or other camera types. The cameras may be used to capture image data around an entire periphery of the vehicle 400. The types of cameras used depends on the embodiments and requirements for the vehicle 400, and any combination of camera types may be used to provide the necessary coverage around the vehicle 400. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 4A and FIG. 4B.

The vehicle 400 may further include vibration sensor(s) 442. The vibration sensor(s) 442 may measure vibrations of components of the vehicle, such as the axle(s). For example, changes in vibrations may indicate a change in road surfaces. In another example, when two or more vibration sensors 442 are used, the differences between the vibrations may be used to determine friction or slippage of the road surface (e.g., when the difference in vibration is between a power-driven axle and a freely rotating axle).

The vehicle 400 may include an ADAS system 438. The ADAS system 438 may include an SoC, in some examples. The ADAS system 438 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 460, LIDAR sensor(s) 464, and/or a camera(s). The ACC systems may include longitudinal ACC and/or lateral ACC. Longitudinal ACC monitors and controls the distance to the vehicle immediately ahead of the vehicle 400 and automatically adjusts the vehicle speed to maintain a safe distance from vehicles ahead. Lateral ACC performs distance keeping, and advises the vehicle 400 to change lanes when necessary. Lateral ACC is related to other ADAS applications such as LC and CWS.

CACC uses information from other vehicles that may be received via the network interface 424 and/or the wireless antenna(s) 426 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication links. In general, the V2V communication concept provides information about the immediately preceding vehicles (e.g., vehicles immediately ahead of and in the same lane as the vehicle 400), while the I2V communication concept provides information about traffic farther ahead. CACC systems may include either or both I2V and V2V information sources. Given the information of the vehicles ahead of the vehicle 400, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 460, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 460, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 400 crosses lane markings. An LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 400 if the vehicle 400 starts to exit the lane. BSW systems detect and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 460, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 400 is backing up. Some RCTW systems include AEB to ensure that the vehicle brakes are applied to avoid a crash. RCTW systems may use one or more rear-facing RADAR sensor(s) 460, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 400, the vehicle 400 itself must, in the case of conflicting results, decide whether to heed the result from a primary computer or a secondary computer (e.g., a first controller 436 or a second controller 436). For example, in some embodiments, the ADAS system 438 may be a backup and/or secondary computer for providing perception information to a backup computer rationality module. The backup computer rationality monitor may run a redundant diverse software on hardware components to detect faults in perception and dynamic driving tasks. Outputs from the ADAS system 438 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output can be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 404.

In other examples, ADAS system 438 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity make the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware used by the primary computer is not causing material error.

In some examples, the output of the ADAS system 438 may be fed into the primary computer's perception block and/or the primary computer's dynamic driving task block. For example, if the ADAS system 438 indicates a forward crash warning due to an object immediately ahead, the perception block may use this information when identifying objects. In other examples, the secondary computer may have its own neural network that is trained and thus reduces the risk of false positives, as described herein.

The vehicle 400 may further include the infotainment SoC 430 (e.g., an in-vehicle infotainment system (IVI)). Although illustrated and described as an SoC, the infotainment system may not be a SoC, and may include two or more discrete components. The infotainment SoC 430 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 400. For example, the infotainment SoC 430 may include radios, disk players, navigation systems, video players, USB and Bluetooth connectivity, carputers, in-car entertainment, Wi-Fi, steering wheel audio controls, hands-free voice control, a heads-up display (HUD), an HMI display 434, a telematics device, a control panel (e.g., for controlling and/or interacting with various components, features, and/or systems), and/or other components. The infotainment SoC 430 may further be used to provide information (e.g., visual and/or audible) to a user(s) of the vehicle, such as information from the ADAS system 438, autonomous driving information such as planned vehicle maneuvers, trajectories, surrounding environment information (e.g., intersection information, vehicle information, road information, etc.), and/or other information.

The infotainment SoC 430 may include GPU functionality. The infotainment SoC 430 may communicate over the bus 402 (e.g., CAN bus, Ethernet, etc.) with other devices, systems, and/or components of the vehicle 400. In some examples, the infotainment SoC 430 may be coupled to a supervisory MCU such that the GPU of the infotainment system may perform some self-driving functions in the event that the primary controller(s) 436 (e.g., the primary and/or backup computers of the vehicle 400) fail. In such an example, the infotainment SoC 430 may put the vehicle 400 into a chauffeur to safe-stop mode, as described herein.

The vehicle 400 may further include an instrument cluster 432 (e.g., a digital dash, an electronic instrument cluster, a digital instrument panel, etc.). The instrument cluster 432 may include a controller and/or supercomputer (e.g., a discrete controller or supercomputer). The instrument cluster 432 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 430 and the instrument cluster 432. In other words, the instrument cluster 432 may be included as part of the infotainment SoC 430, or vice versa.

Figure 4D:
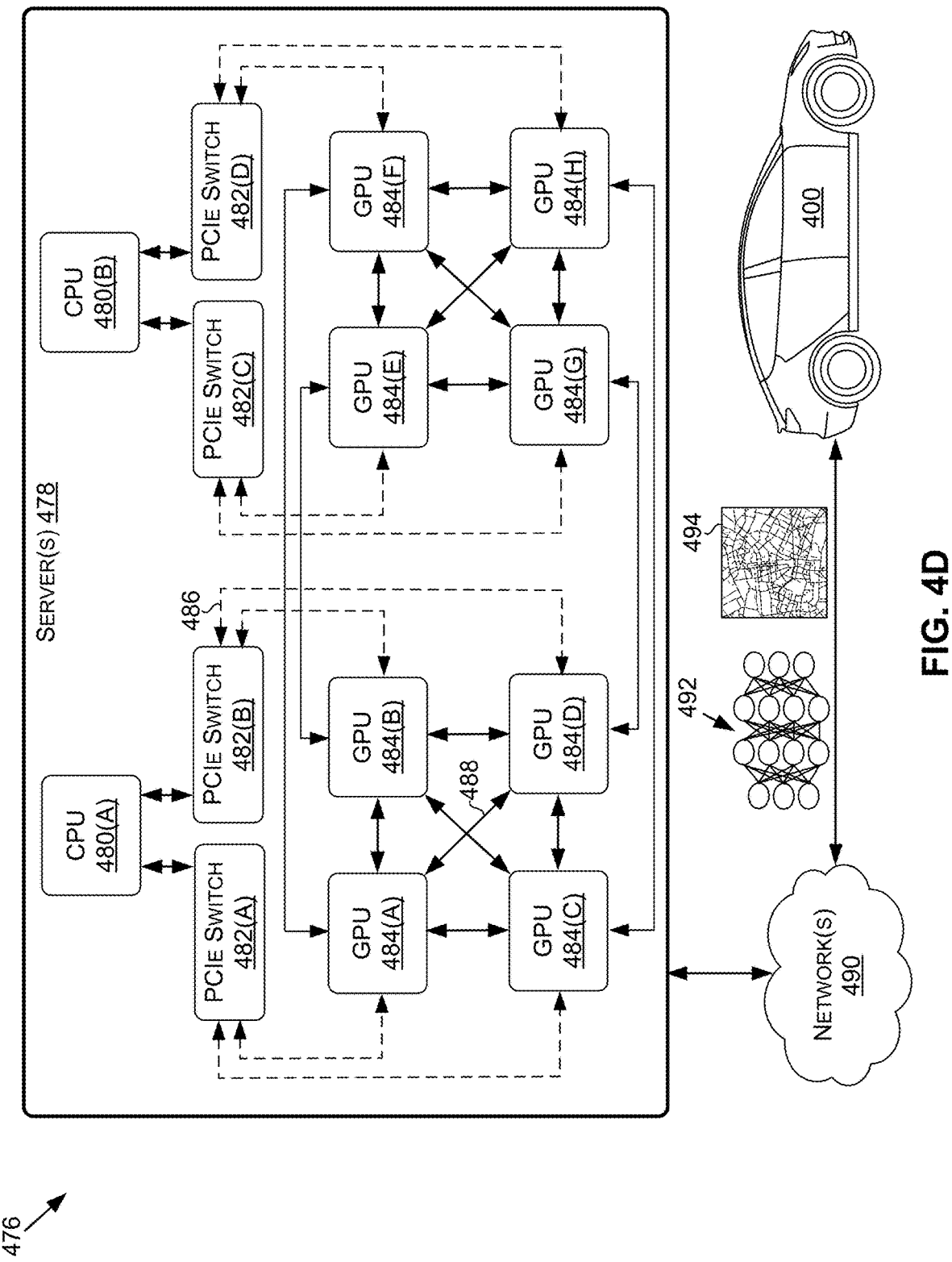
FIG. 4D is a system diagram for communication between cloud-based server(s) and the example autonomous vehicle of FIG. 4A, in accordance with some embodiments of the present disclosure.

FIG. 4D is a system diagram for communication between cloud-based server(s) and the example autonomous vehicle 400 of FIG. 4A, in accordance with some embodiments of the present disclosure. The system 476 may include server(s) 478, network(s) 490, and vehicles, including the vehicle 400. The server(s) 478 may include a plurality of GPUs 484(A)-484(H) (collectively referred to herein as GPUs 484), PCIe switches 482(A)-482(H) (collectively referred to herein as PCIe switches 482), and/or CPUs 480(A)-480(B) (collectively referred to herein as CPUs 480). The GPUs 484, the CPUs 480, and the PCIe switches may be interconnected with high-speed interconnects such as, for example and without limitation, NVLink interfaces 488 developed by NVIDIA and/or PCIe connections 486. In some examples, the GPUs 484 are connected via NVLink and/or NVSwitch SoC and the GPUs 484 and the PCIe switches 482 are connected via PCIe interconnects. Although eight GPUs 484, two CPUs 480, and two PCIe switches are illustrated, this is not intended to be limiting. Depending on the embodiment, each of the server(s) 478 may include any number of GPUs 484, CPUs 480, and/or PCIe switches. For example, the server(s) 478 may each include eight, sixteen, thirty-two, and/or more GPUs 484.

The server(s) 478 may receive, over the network(s) 490 and from the vehicles, image data representative of images showing unexpected or changed road conditions, such as recently commenced roadwork. The server(s) 478 may transmit, over the network(s) 490 and to the vehicles, neural networks 492, updated neural networks 492, and/or map information 494, including information regarding traffic and road conditions. The updates to the map information 494 may include updates for the HD map 422, such as information regarding construction sites, potholes, detours, flooding, and/or other obstructions. In some examples, the neural networks 492, the updated neural networks 492, and/or the map information 494 may have resulted from new training and/or experiences represented in data received from any number of vehicles in the environment, and/or based on training performed at a datacenter (e.g., using the server(s) 478 and/or other servers).

The server(s) 478 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 490, and/or the machine learning models may be used by the server(s) 478 to remotely monitor the vehicles.

In some examples, the server(s) 478 may receive data from the vehicles and apply the data to up-to-date real-time neural networks for real-time intelligent inferencing. The server(s) 478 may include deep-learning supercomputers and/or dedicated AI computers powered by GPU(s) 484, such as a DGX and DGX Station machines developed by NVIDIA. However, in some examples, the server(s) 478 may include deep learning infrastructure that use only CPU-powered datacenters.

The deep-learning infrastructure of the server(s) 478 may be capable of fast, real-time inferencing, and may use that capability to evaluate and verify the health of the processors, software, and/or associated hardware in the vehicle 400. For example, the deep-learning infrastructure may receive periodic updates from the vehicle 400, such as a sequence of images and/or objects that the vehicle 400 has located in that sequence of images (e.g., via computer vision and/or other machine learning object classification techniques). The deep-learning infrastructure may run its own neural network to identify the objects and compare them with the objects identified by the vehicle 400 and, if the results do not match and the infrastructure concludes that the AI in the vehicle 400 is malfunctioning, the server(s) 478 may transmit a signal to the vehicle 400 instructing a fail-safe computer of the vehicle 400 to assume control, notify the passengers, and complete a safe parking maneuver.

For inferencing, the server(s) 478 may include the GPU(s) 484 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Figure 5:
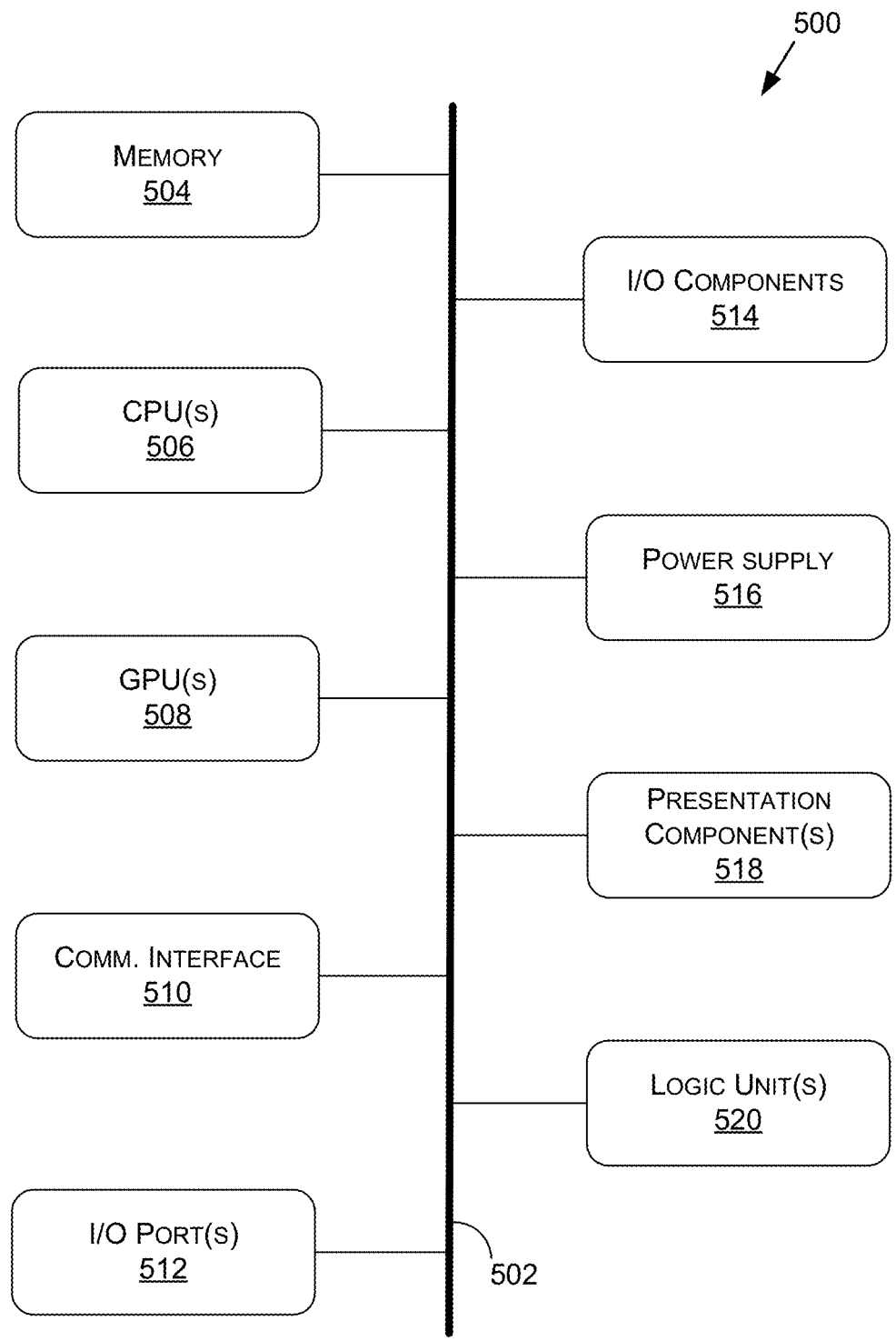
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, I/O ports 512, input/output components 514, a power supply 516, one or more presentation components 518 (e.g., display(s)), and one or more logic units 520.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," "augmented reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point, connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), I/O elements, peripheral component interconnect (PCI) or peripheral component interconnect express (PCIe) elements, and/or the like.

The communication interface 510 may include one or more receivers, transmitters, and/or transceivers that enable the computing device 500 to communicate with other computing devices via an electronic communication network, including wired and/or wireless communications. The communication interface 510 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 512 may enable the computing device 500 to be logically coupled to other devices including the I/O components 514, the presentation component(s) 518, and/or other components, some of which may be built into (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that enable detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to enable the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

Figure 6:
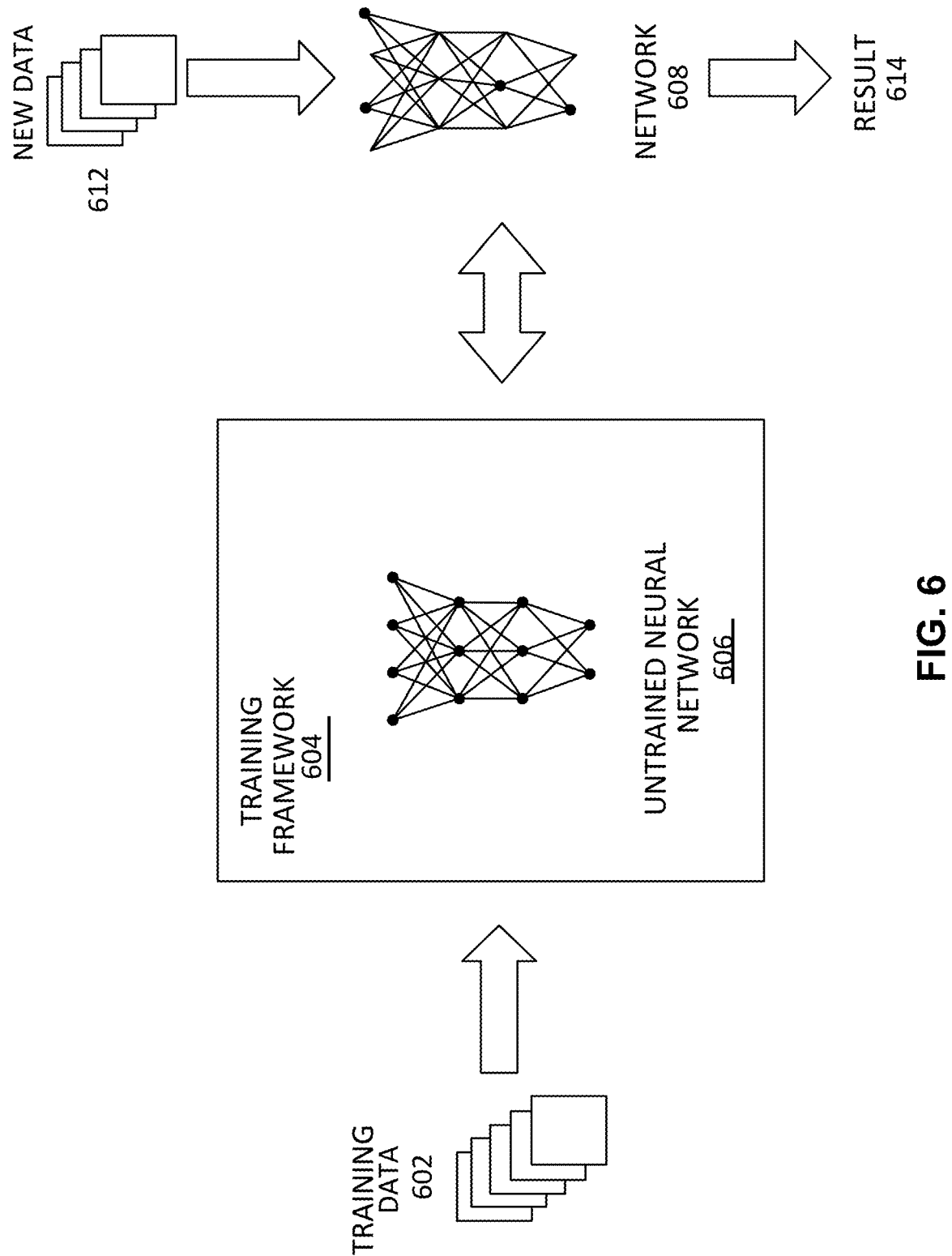
FIG. 6 illustrates training and deployment of a machine learning model of embodiments of the disclosure.

FIG. 6 illustrates training and deployment of a machine learning model of embodiments of the disclosure. In at least one embodiment, the machine learning model may include a neural network such as a CNN. An untrained neural network 606 is trained using a training dataset 602 which, in some embodiments of the disclosure may be a set of images of subjects assuming various head poses. In at least one embodiment, training framework 604 is a PyTorch framework, whereas in other embodiments, training framework 604 is a TensorFlow, Boost, Caffe, Microsoft Cognitive Toolkit/CNTK, MXNet, Chainer, Keras, Deeplearning4j, or other training framework. Training framework 604 trains an untrained neural network 606 using processing resources described herein, to generate a trained neural network 608. In at least one embodiment, initial weights may be chosen randomly or by pre-training using a deep belief network. Training may be performed in either a supervised, partially supervised, or unsupervised manner.

In at least one embodiment, such as when a regression classifier is used, untrained neural network 606 may be trained using supervised learning, wherein training dataset 602 includes an input paired with a desired output, or where training dataset 602 includes input having known output and outputs of neural networks are manually graded. In at least one embodiment, untrained neural network 606 is trained in a supervised manner. Training framework 604 processes inputs from training dataset 602 and compares resulting outputs against a set of expected or desired outputs. In at least one embodiment, errors are then propagated back through untrained neural network 606. Training framework 604 adjusts weights that control untrained neural network 606. Training framework 604 may include tools to monitor how well untrained neural network 606 is converging towards a model, such as trained neural network 608, suitable to generating correct answers, such as in result 614, based on known input data, such as new data 612. In at least one embodiment, training framework 604 trains untrained neural network 606 repeatedly while adjusting weights to refine an output of untrained neural network 606 using a loss function and adjustment process, such as stochastic gradient descent. In at least one embodiment, training framework 604 trains untrained neural network 606 until untrained neural network 606 achieves a desired accuracy. Trained neural network 608 can then be deployed to implement any number of machine learning operations.

In at least one embodiment, untrained neural network 606 may be trained using unsupervised learning, wherein untrained neural network 606 attempts to train itself using unlabeled data. In at least one embodiment, unsupervised learning training dataset 602 may include input data without any associated output data or "ground truth" data. Untrained neural network 606 can learn groupings within training dataset 602 and can determine how individual inputs are related to untrained dataset 602. In at least one embodiment, unsupervised training can be used to generate a self-organizing map, which is a type of trained neural network 608 capable of performing operations useful in reducing dimensionality of new data 612. Unsupervised training can also be used to perform anomaly detection, which allows identification of data points in a new dataset 612 that deviate from normal or existing patterns of new dataset 612.

In at least one embodiment, semi-supervised learning may be used, which is a technique in which training dataset 602 includes a mix of labeled and unlabeled data. Training framework 604 may thus be used to perform incremental learning, such as through transferred learning techniques. Such incremental learning enables trained neural network 608 to adapt to new data 612 without forgetting knowledge instilled within the network during initial training.

Figure 7:
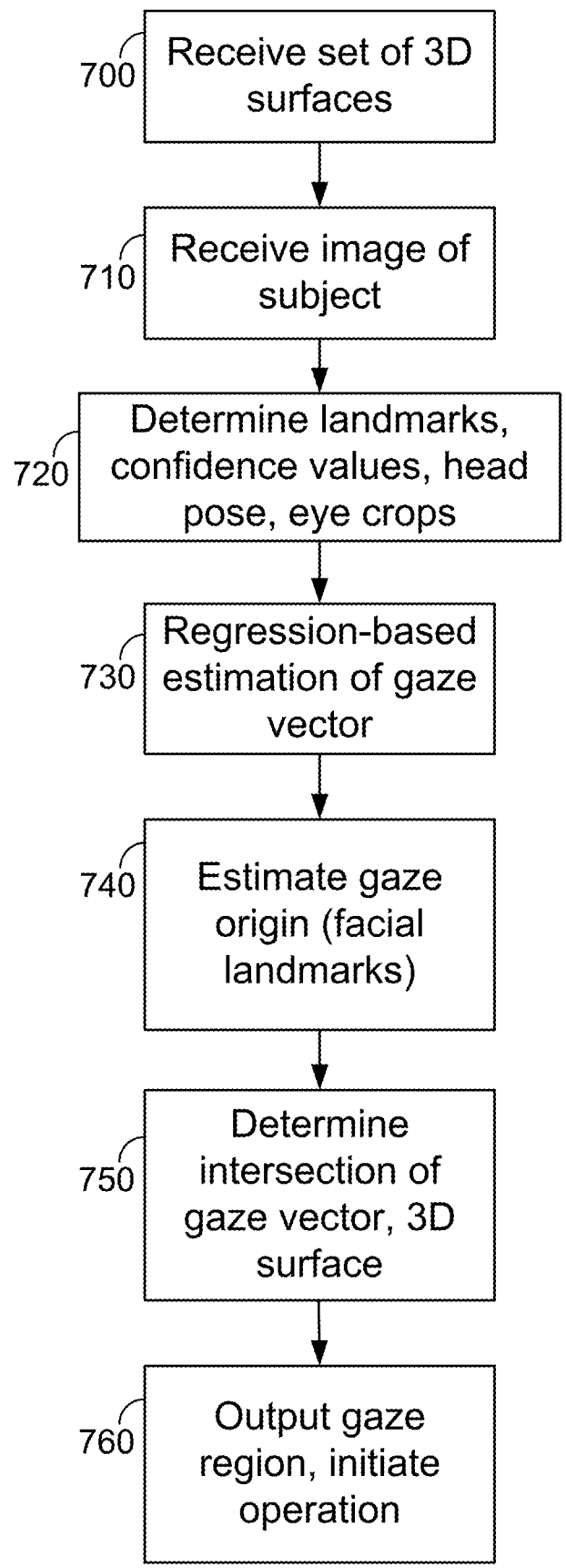
FIG. 7 is a flowchart illustrating process steps for determining gaze direction and mapping this gaze direction to regions of any three-dimensional geometry, in accordance with embodiments of the disclosure.

FIG. 7 is a flowchart illustrating process steps for determining gaze direction and mapping this gaze direction to regions of any three-dimensional geometry, in accordance with embodiments of the disclosure. The process of FIG. 7 may begin with the computing device 300 receiving the set of three-dimensional surfaces corresponding to the environment surrounding the subject (Step 700). The computing device 300 also receives an image of the subject taken by the camera (Step 710). Computing device 300 then identifies the face and eyes of the subject in the received image, and determines facial landmark values, associated confidence values, and eye crops (Step 720) as above. These quantities are then used as input variables of a regression-based estimation of the gaze vector (Step 730) by the adaptive inference fusion module 280 of FIG. 2B, as well as inputs to the gaze origin estimation module 240 of FIG. 2A for determining the origin point of the gaze vector (Step 740). As above, gaze origin is determined from facial landmarks in particular.

Once the gaze vector and its origin point are determined, the mapping module 250 of FIG. 2A determines the intersection of the gaze vector, if any, with the three-dimensional surfaces of Step 700 (Step 750). The surface or region intersected by the gaze vector is then output, and any responsive operation may be initiated (Step 760).

It is noted that systems and processes of embodiments of the disclosure may be employed to determine the intersection of gaze with surfaces both in/on an object, and external to an object. In particular, the three-dimensional surfaces imported to mapping module 250 may include surfaces of an object as well as surfaces external to or remote from that object, and mapping module 250 may determine the intersection of gaze vectors with both surfaces of the object and surfaces remote therefrom. For example, sets of three-dimensional surfaces may include surfaces of a vehicle interior and objects external to the vehicle such as stop signs, traffic lights, simulated pedestrians, or the like. Mapping module 250 may then determine both the vehicle window through which the driver is gazing, and whether or not the driver is gazing at a particular object such as a stop sign. To that end, sensors of a vehicle (e.g., cameras or other image sensors, Light Detection and Ranging (LIDAR) sensors, other remote sensing devices, or the like) may determine the positions and shapes of objects near the vehicle. Processors of the vehicle may then convert this sensor output to three-dimensional surfaces in the same coordinate system as the stored three-dimensional vehicle surfaces, and store them as additional surfaces of the three-dimensional surface set. The mapping module 250 may then determine both the intersection of calculated gaze vectors with both surfaces of the vehicle and any stored surfaces of objects external to the vehicle. In this manner, systems may determine, for example, whether drivers are aware of, e.g., gazing in the direction of, various potential road hazards or other items that drivers should be paying attention to.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, facial landmarks and confidence values may be determined in any manner, and gaze vector may be determined using any regression technique or other suitable approach. Additionally, embodiments of the disclosure contemplate use of any three-dimensional surfaces or volumes, determined and characterized in any manner, for determining intersections of gaze vectors therewith. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
   determining, based at least on at least one image of an occupant of a machine, a gaze direction of the occupant;
   determining, based at least on the gaze direction, that a gaze of the occupant intersects with at least a spatial region corresponding to a three-dimensional (3D) surface of an object disposed within an interior of the machine; and
   initiating an operation based at least on the gaze of the occupant intersecting with the spatial region.

2. The method of claim 1, further comprising:
   retrieving data representing one or more spatial regions corresponding to one or more 3D surfaces of one or more objects disposed within the interior the machine, the one or more spatial regions including at least the spatial region,
   wherein the determining that the gaze of the occupant intersects with the at least the spatial region corresponding to the 3D surface is further based at least on the data.

3. The method of claim 1, further comprising:
   determining, based at least on one or more of the at least one image of the occupant or at least one second image, the spatial region corresponding to the 3D surface of the object,
   wherein the determining that the gaze of the occupant intersects with the least the spatial region corresponding to the 3D surface of the object is further based at least on the determining the spatial region corresponding to the 3D surface of the object.

4. The method of claim 1, further comprising:
   retrieving a map representing a 3D layout of the interior of the machine, the 3D layout indicating one or more locations of one or more spatial regions including the spatial region,
   wherein the determining that the gaze of the occupant intersects with the at least the spatial region corresponding to the 3D surface of the object is further based at least on the map.

5. The method of claim 1, wherein the determining that the gaze of the occupant intersects with the spatial region corresponding to the 3D surface of the object comprises:
   projecting the gaze direction onto the spatial region; and
   determining, based at least on the projecting, that the gaze of the occupant intersects with the spatial region corresponding to the 3D surface of the object.

6. The method of claim 1, wherein the determining the gaze direction of the occupant comprises:
   determining, based at least on the at least one image of the occupant of the machine, at least one of one or more facial landmark points of the occupant or a head pose of the occupant; and
   determining the gaze direction of the occupant based at least on the at least one of the one or more facial landmark points of the occupant or the head pose of the occupant.

7. The method of claim 1, wherein the determining the gaze direction of the occupant comprises determining, using one or more neural networks and based at least on the at least one image of the occupant of the machine, the gaze direction of the occupant.

8. The method of claim 1, further comprising:
   determining, based at least on audio data, speech information associated with the occupant,
   wherein the initiating the operation is further based at least on the speech information.

9. The method of claim 1, further comprising:
   determining a position associated with the occupant within the machine,
   wherein the determining that the gaze of the occupant intersects with the at least the spatial region corresponding to the 3D surface of the object is further based at least on the position.

10. A system comprising:
one or more processing units to:
- determine, based at least on at least one first image generated using one or more first sensors disposed within an interior of a cabin of a machine, a gaze direction of an occupant of the machine;
- determine, based at least on the gaze direction and at least one second image depicting at least a portion of an object and generated using one or more second sensors of the machine, that a gaze of the occupant intersects with at least a spatial region corresponding to a three-dimensional (3D) surface of the object; and
- initiate an operation based at least on the gaze of the occupant intersecting with the spatial region.

11. The system of claim 10, wherein:
one or more first sensors include one or more interior-facing sensor; and
the one or more second sensors include one or more exterior-facing sensors.

12. The system of claim 10, wherein the determination that the gaze of the occupant intersects with the at least the spatial region corresponding to the 3D surface of the object comprises:
- determining, based at least on the at least one second image depicting the at least the portion of the object, the spatial region corresponding to the 3D surface of the object; and
- determining, based at least on the gaze direction, that the gaze of the occupant intersects with the spatial region.

13. The system of claim 10, wherein the determination that the gaze of the occupant intersects with the at least the spatial region corresponding to the 3D surface of the object comprises:
- projecting, based at least on the at least one second image depicting the at least the portion of the object, the gaze direction onto the spatial region that corresponds to the 3D surface of the object; and
- determining, based at least on the projecting, that the gaze of the occupant intersects with the spatial region.

14. The system of claim 10, wherein the determination of the gaze direction of the occupant of the machine comprises:
- determining, based at least on the at least one first image, at least one of one or more facial landmark points of the occupant or a head pose of the occupant; and
- determining the gaze direction of the occupant of the machine based at least on the at least one of the one or more facial landmark points of the occupant or the head pose of the occupant.

15. The system of claim 10, wherein the determination of the gaze direction of the occupant of the machine comprises determining, using one or more neural networks and based at least on the at least one first image, the gaze direction of the occupant of the machine.

16. The system of claim 10, wherein the one or more processing units are further to:
- determine, based at least on audio data, speech information associated with the occupant,
- wherein the initiation of the operation is further based at least on the speech information.

17. The system of claim 10, wherein the one or more processing units are further to:
- determine a position associated with the occupant within the machine,
- wherein the determination that the gaze of the occupant intersects with the at least the spatial region corresponding to the 3D surface of the object is further based at least on the position.

18. The system of claim 10, wherein the system is comprised in at least one of:
- a control system for an autonomous machine;
- a perception system for an autonomous machine;
- a system for performing simulation operations;
- a system for generating or presenting at least one of virtual reality content or augmented reality content;
- a system for performing deep learning operations;
- a system implemented at least partially in a data center; or
- a system implemented at least partially using cloud computing resources.

19. A processor comprising:
one or more processing units to initiate an operation based at least on determining that a gaze of an occupant of a machine intersects with a spatial region corresponding to a three-dimensional (3D) surface of an object, wherein the determining that the gaze of the occupant of the machine intersects with the spatial region is based at least image data representing one or more images.

20. The processor of claim 19, wherein the processor is comprised in at least one of:
- a control system for an autonomous machine;
- a perception system for an autonomous machine;
- a system for performing simulation operations;
- a system for generating or presenting at least one of virtual reality content or augmented reality content;
- a system for performing deep learning operations;
- a system implemented at least partially in a data center; or
- a system implemented at least partially using cloud computing resources.

* * * * *